United States Patent
Jang et al.

(10) Patent No.: US 10,917,639 B2
(45) Date of Patent: Feb. 9, 2021

(54) INTRA-PREDICTION MODE-BASED IMAGE PROCESSING METHOD AND DEVICE THEREFOR

(71) Applicant: LG Electronics Inc., Seoul (KR)

(72) Inventors: Hyeongmoon Jang, Seoul (KR); Junghak Nam, Seoul (KR); Jaehyun Lim, Seoul (KR); Jin Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/324,452

(22) PCT Filed: Feb. 7, 2017

(86) PCT No.: PCT/KR2017/001340
§ 371 (c)(1),
(2) Date: Feb. 8, 2019

(87) PCT Pub. No.: WO2018/030599
PCT Pub. Date: Feb. 15, 2018

(65) Prior Publication Data
US 2019/0174128 A1 Jun. 6, 2019

Related U.S. Application Data

(60) Provisional application No. 62/372,271, filed on Aug. 8, 2016.

(51) Int. Cl.
*H04N 19/11* (2014.01)
*H04N 19/132* (2014.01)
(Continued)

(52) U.S. Cl.
CPC .......... *H04N 19/11* (2014.11); *H04N 19/105* (2014.11); *H04N 19/119* (2014.11);
(Continued)

(58) Field of Classification Search
CPC .... H04N 19/11; H04N 19/132; H04N 19/176; H04N 19/159; H04N 19/119
(Continued)

(56) References Cited

U.S. PATENT DOCUMENTS 9,313,503 B2 * 4/2016 Song ............... H04N 19/70
2011/0286679 A1 11/2011 Boon et al.
(Continued)

FOREIGN PATENT DOCUMENTS

| KR | 1020140049098 | 4/2014 |
| KR | 1020150013917 | 2/2015 |
| KR | 101516347 B1 | 5/2015 |

OTHER PUBLICATIONS

Cao et al., "Short Distance Intra Coding Scheme for High Efficiency Video Coding," IEEE Transactions on Image Processing, vol. 22, No. 2, dated Feb. 2013, 12 pages, XP011492284.
(Continued)

*Primary Examiner* — Zaihan Jiang
(74) *Attorney, Agent, or Firm* — Fish & Richardson P.C.

(57) ABSTRACT

Disclosed are an intra-prediction mode-based image processing method and a device therefor. Particularly, a method for processing an image on the basis of an intra-prediction mode may comprise the steps of: configuring a reference sample to be used for prediction of a current block on the basis of width information and height information of the current block when the current block is a non-square block; deriving an intra-prediction mode of the current block; and generating a prediction sample of the current block by using the reference sample on the basis of the intra-prediction mode of the current block.

20 Claims, 25 Drawing Sheets

(51) Int. Cl.
    *H04N 19/119*     (2014.01)
    *H04N 19/159*     (2014.01)
    *H04N 19/176*     (2014.01)
    *H04N 19/105*     (2014.01)

(52) U.S. Cl.
    CPC ......... *H04N 19/132* (2014.11); *H04N 19/159* (2014.11); *H04N 19/176* (2014.11)

(58) Field of Classification Search
    USPC .................................................. 375/240.12
    See application file for complete search history.

(56) References Cited

U.S. PATENT DOCUMENTS

| | | | | |
|---|---|---|---|---|
| 2012/0328015 | A1* | 12/2012 | Kim | H04N 19/40 |
| | | | | 375/240.13 |
| 2013/0136175 | A1 | 5/2013 | Wang et al. | |
| 2014/0050263 | A1 | 2/2014 | Kim | |
| 2014/0140404 | A1 | 5/2014 | Liu et al. | |
| 2015/0023405 | A1* | 1/2015 | Joshi | H04N 19/176 |
| | | | | 375/240.02 |
| 2015/0365692 | A1 | 12/2015 | Liu et al. | |
| 2017/0094314 | A1* | 3/2017 | Zhao | H04N 19/61 |
| 2017/0251213 | A1* | 8/2017 | Ye | H04N 19/513 |
| 2017/0272757 | A1* | 9/2017 | Xu | H04N 19/593 |
| 2017/0353730 | A1* | 12/2017 | Liu | H04N 19/122 |
| 2018/0324441 | A1* | 11/2018 | Lim | H04N 19/46 |
| 2018/0343455 | A1* | 11/2018 | Jang | H04N 19/105 |
| 2018/0352221 | A1* | 12/2018 | Lee | H04N 19/159 |
| 2019/0166375 | A1* | 5/2019 | Jun | H04N 19/176 |
| 2019/0182481 | A1* | 6/2019 | Lee | H04N 19/44 |
| 2019/0238835 | A1* | 8/2019 | Lee | H04N 19/593 |

OTHER PUBLICATIONS

Partial Supplementary European Search Report in European Application No. 17839617.2, dated Feb. 20, 2020, 17 pages.

Tsukuba et al., "Adaptive Multidirectional Intra Prediction," VCEG-AG05, ITU—Telecommunications Standardization Sector, Video Coding Experts Group (VCEG), Shenzhen, China, dated Oct. 20, 2007, 6 pages, XP002501810.

* cited by examiner

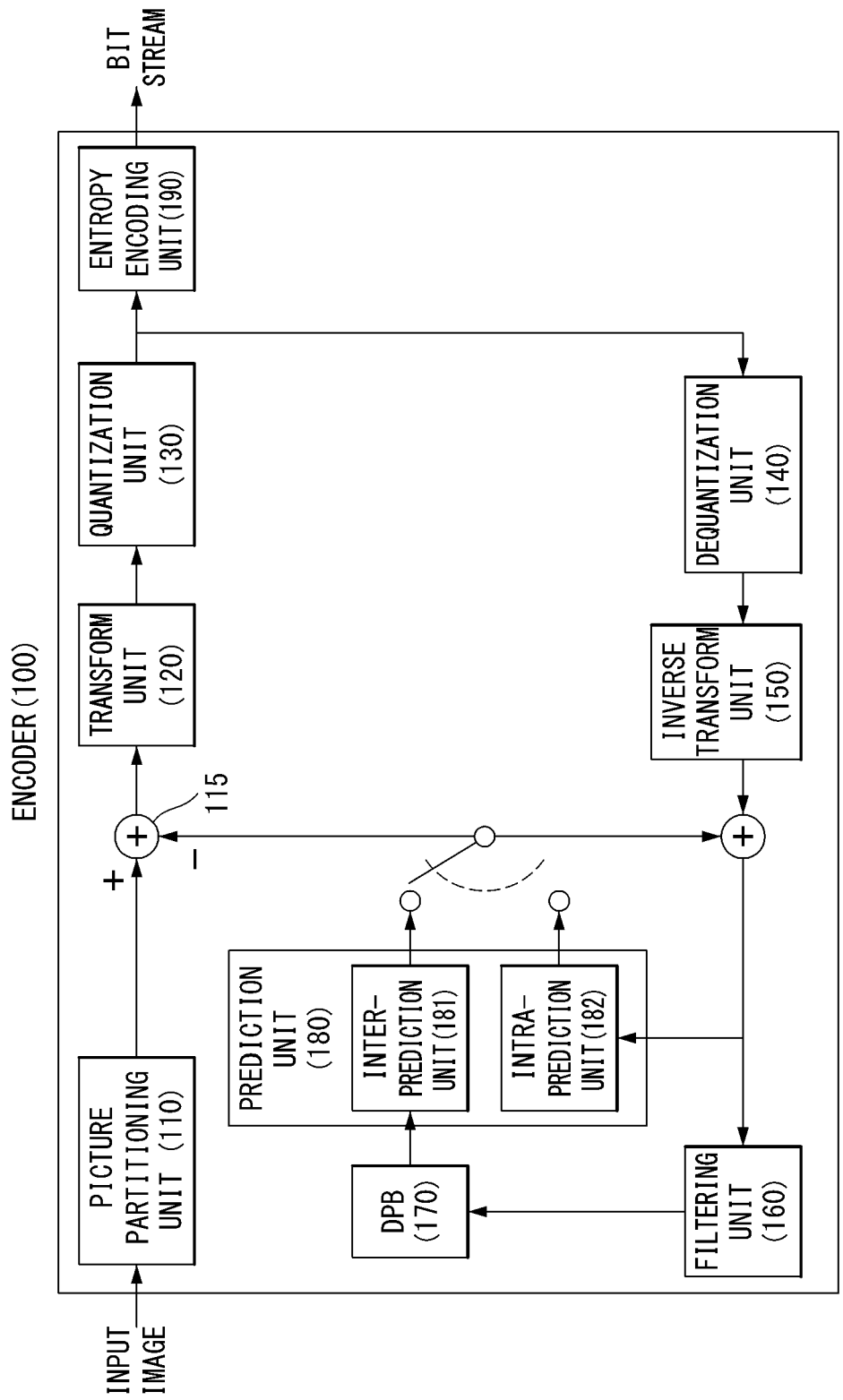
[FIG. 1]

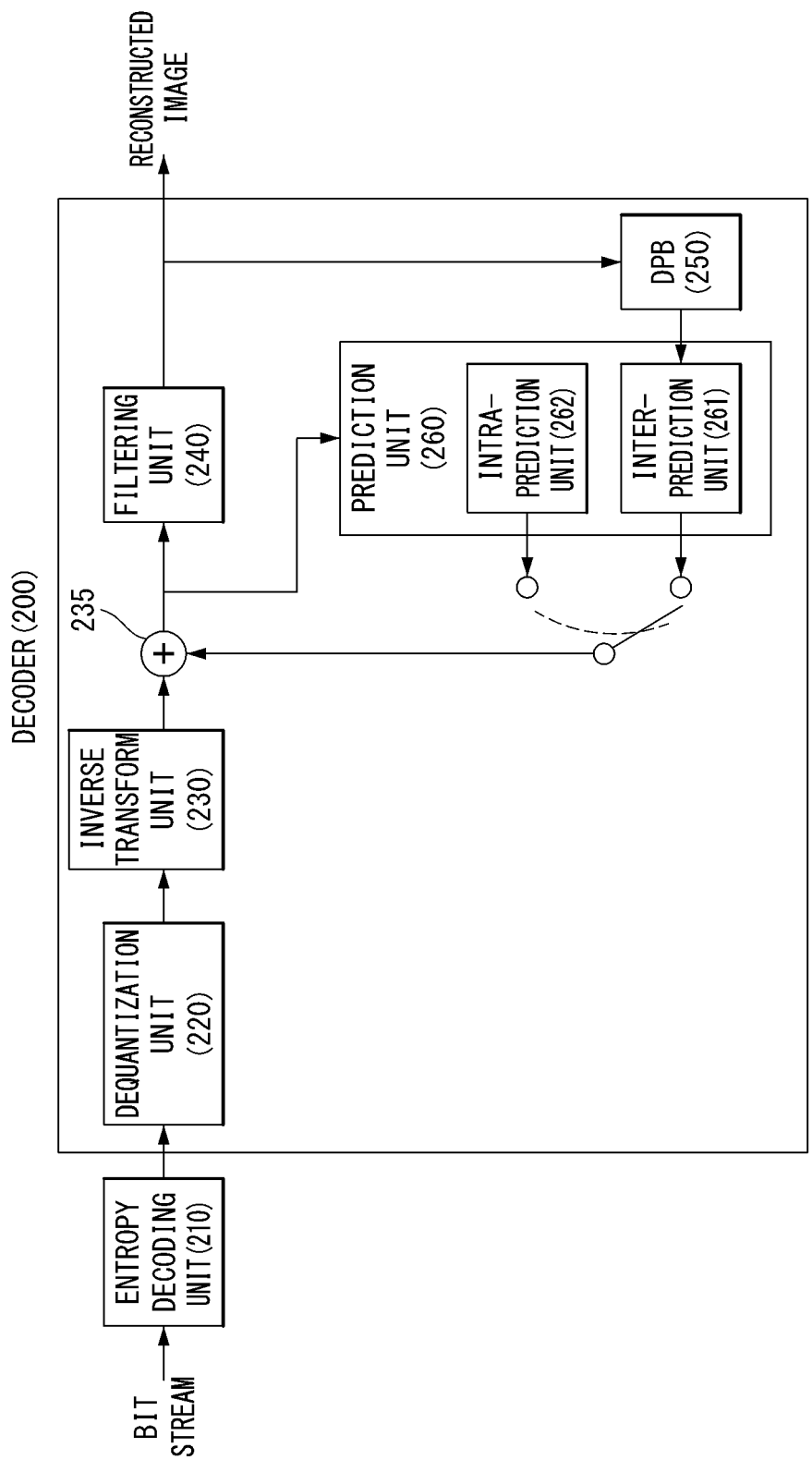
[FIG. 2]

[FIG. 3]
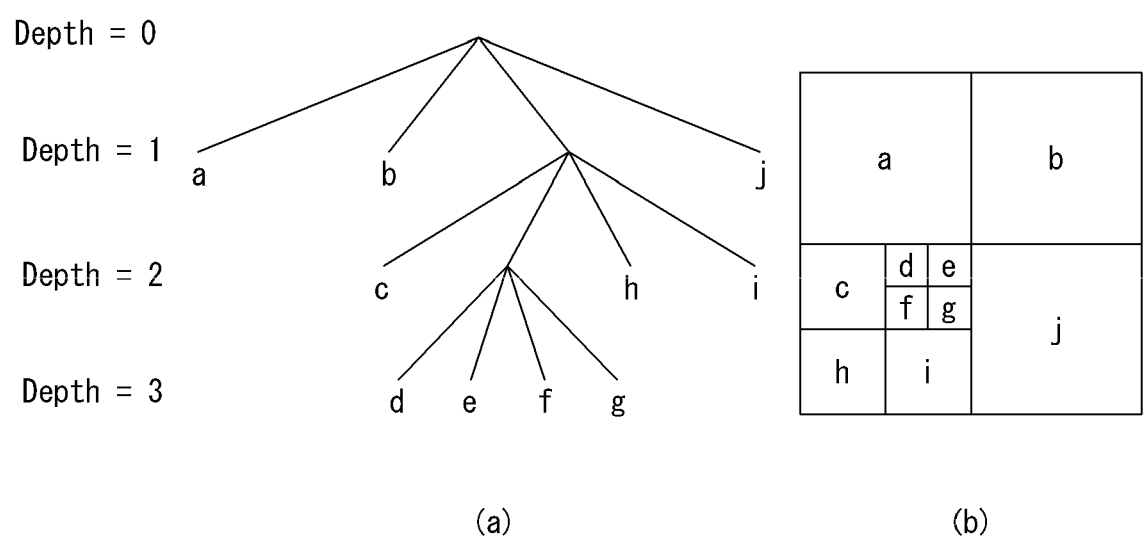
(a)              (b)

[Fig. 4]
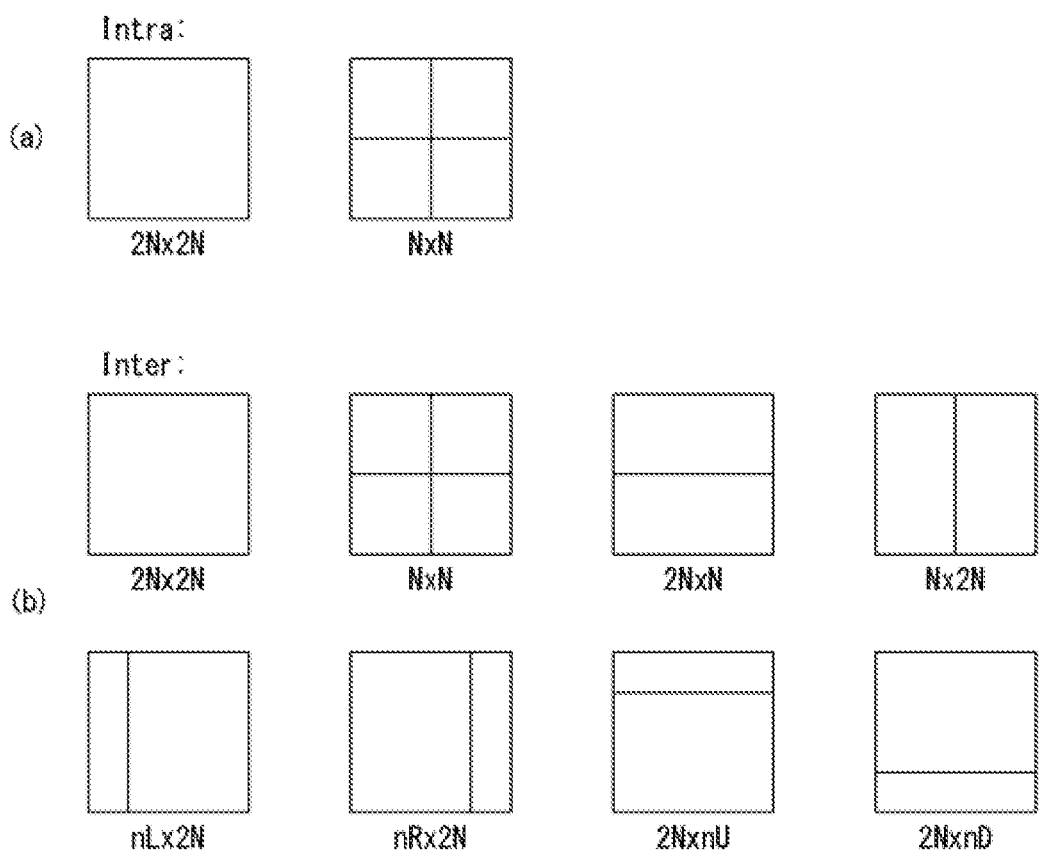

[FIG. 5]
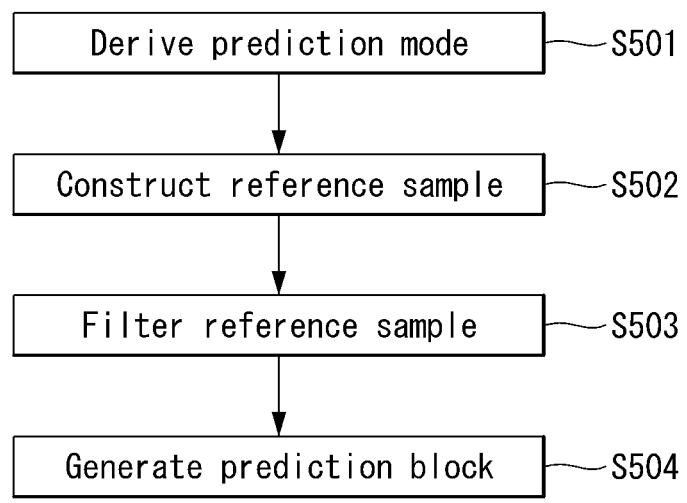

[FIG. 6]
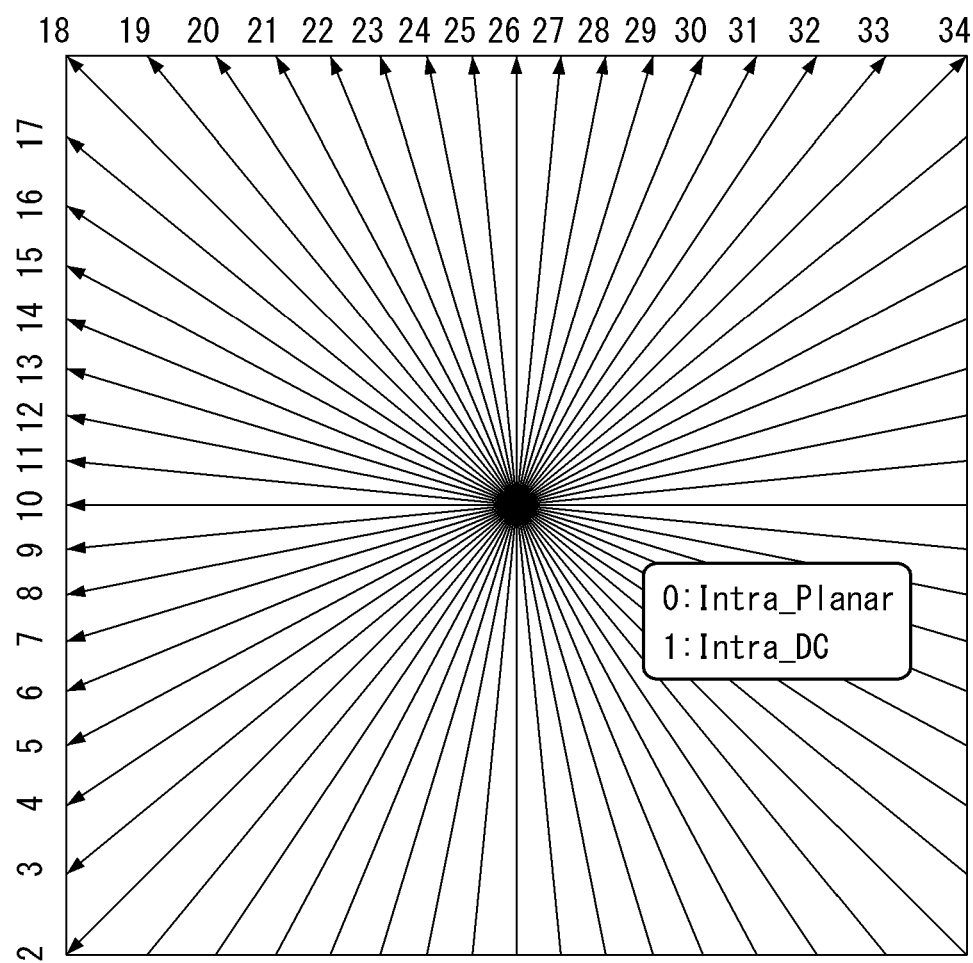

[FIG. 7]
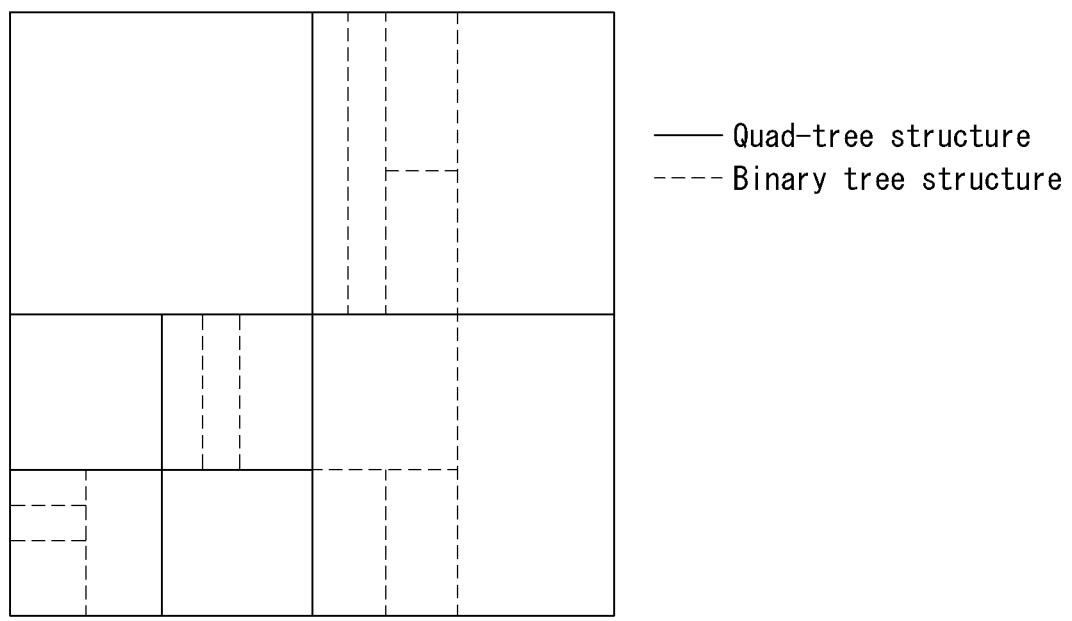

[FIG. 8]
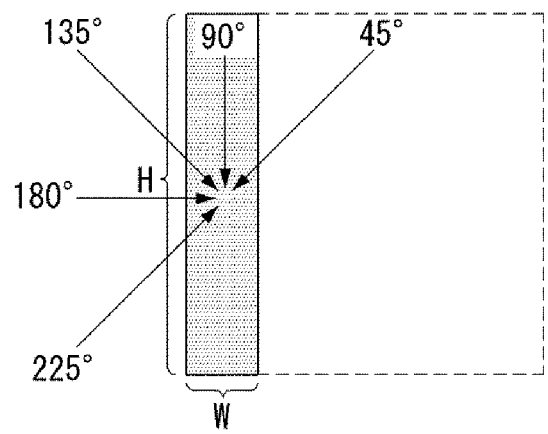
(a)
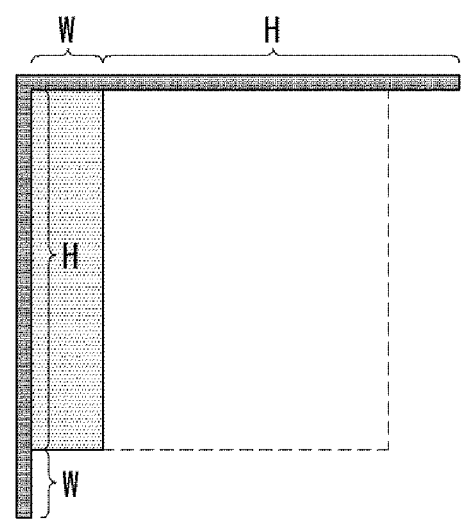
(b)

[FIG. 9]
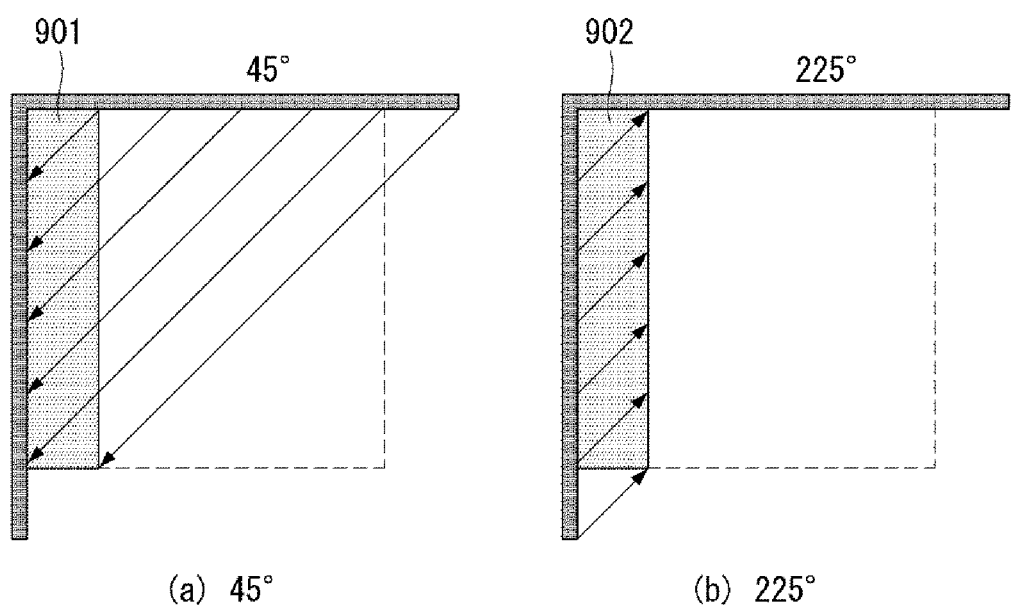
(a) 45°     (b) 225°

[FIG. 10]
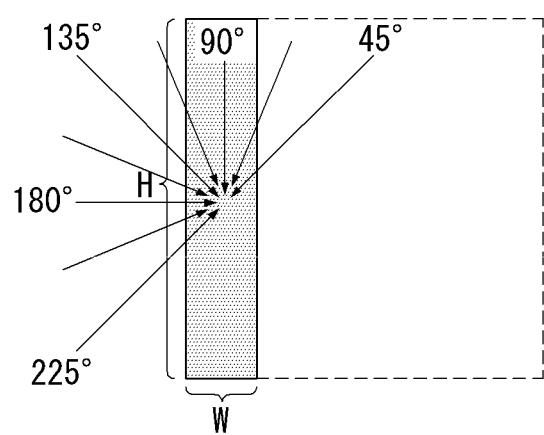
(a) Angel distribution
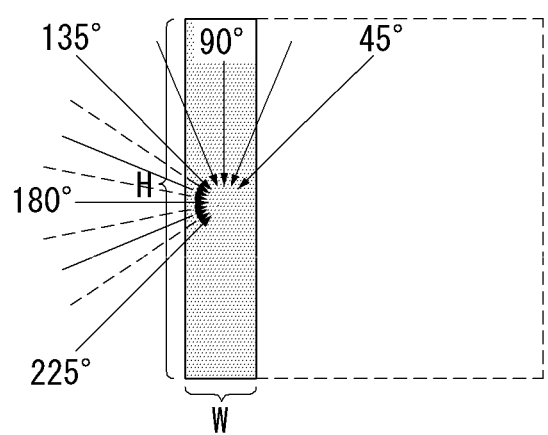
(b) Adaptive angel distribution

[FIG. 11]
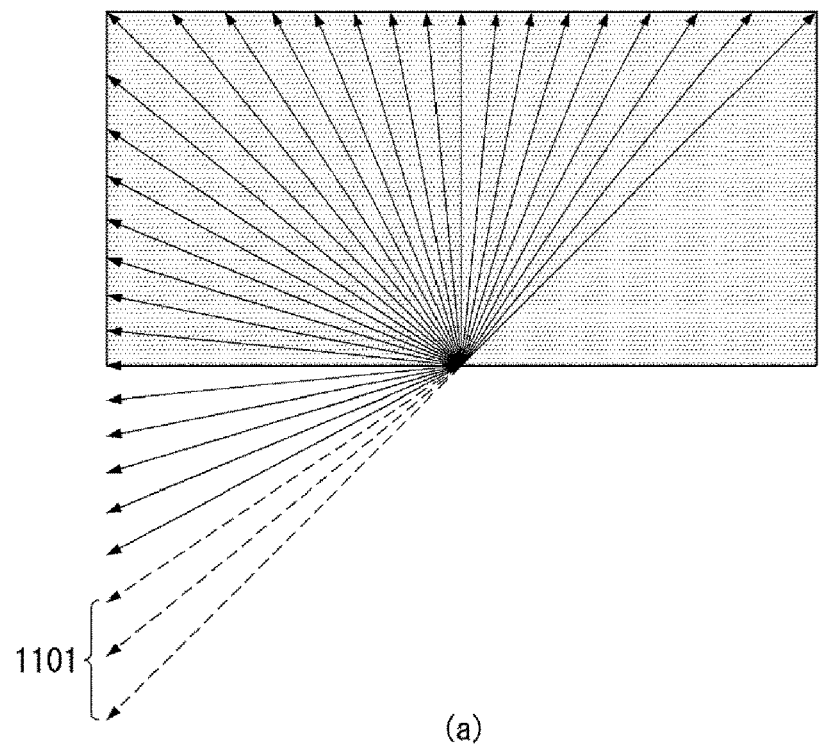
(a)
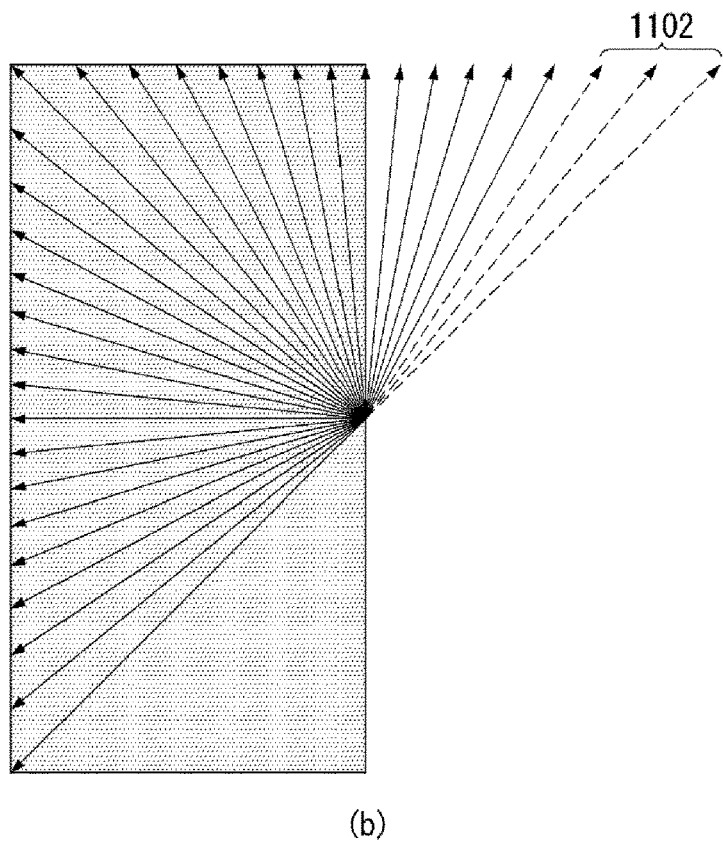
(b)

[FIG. 12]
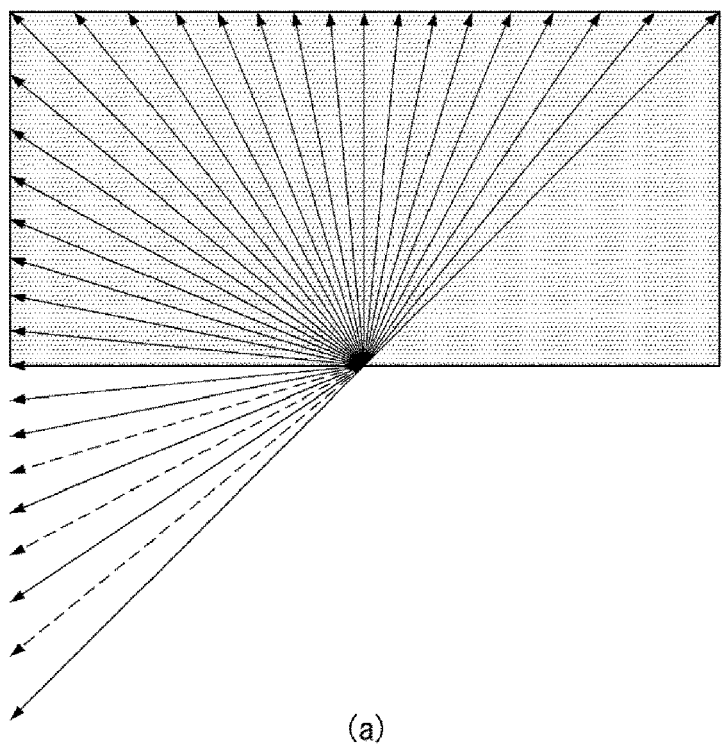
(a)
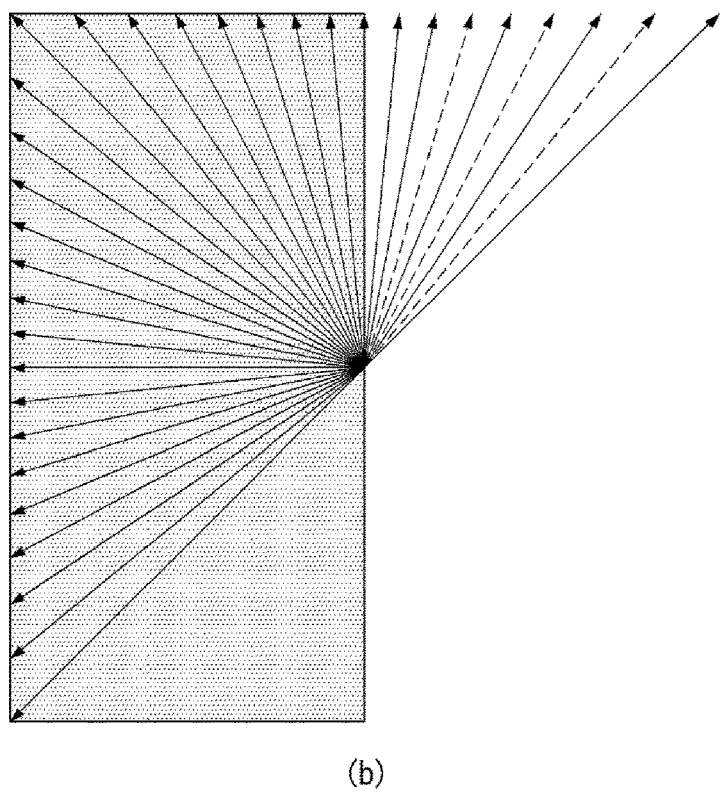
(b)

[FIG. 13]
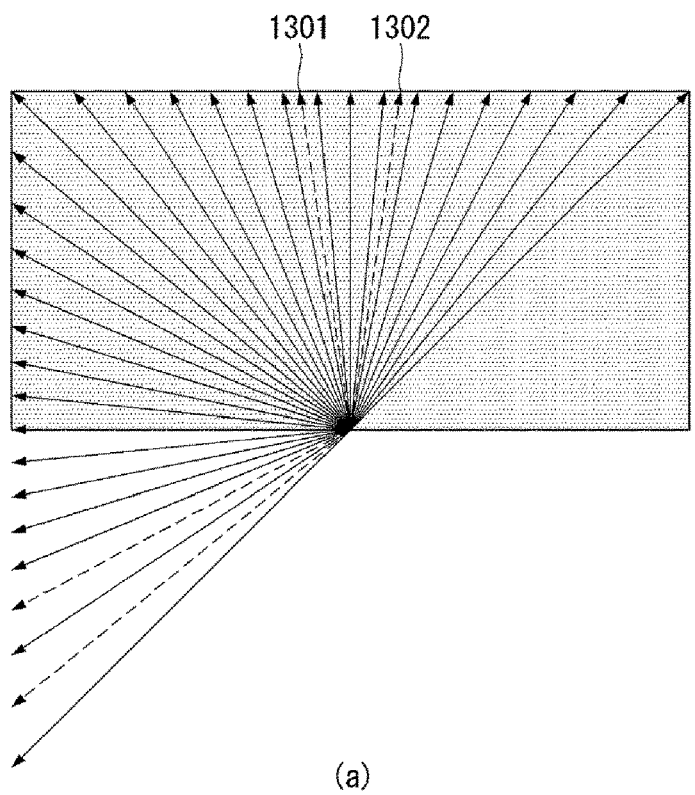
(a)
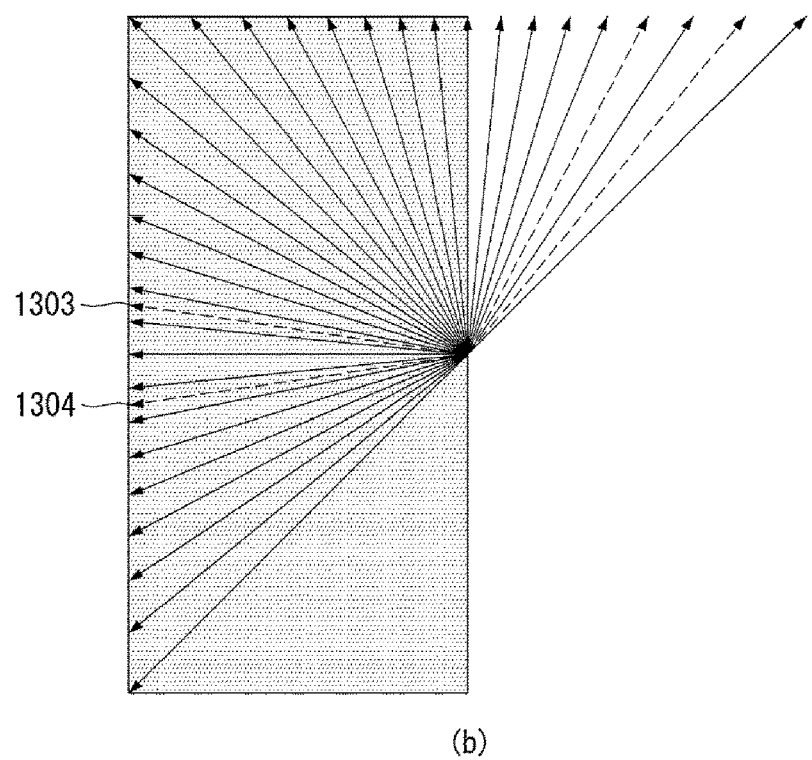
(b)

[FIG. 14]
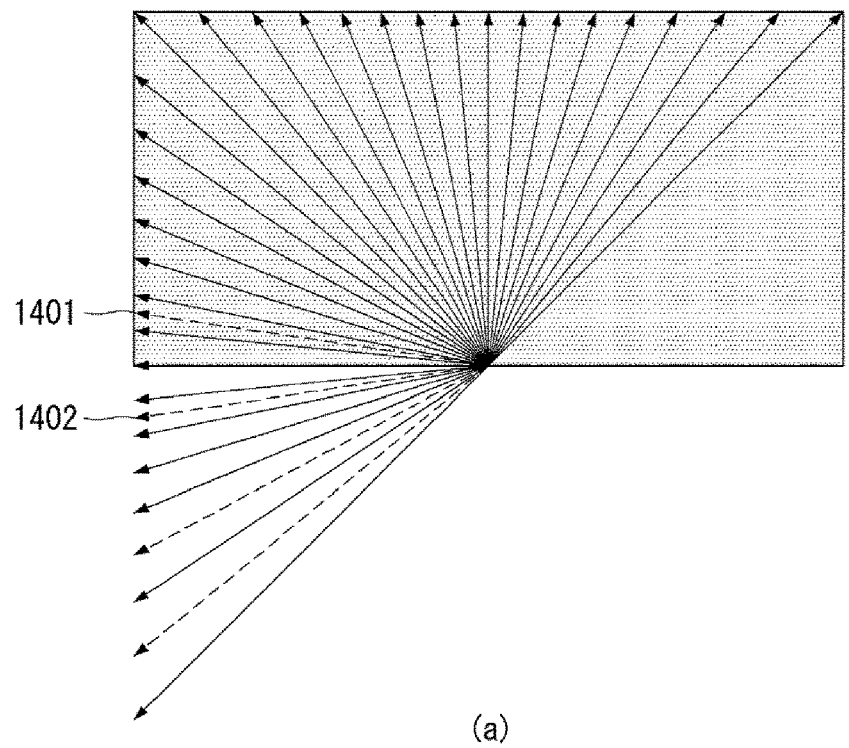
(a)
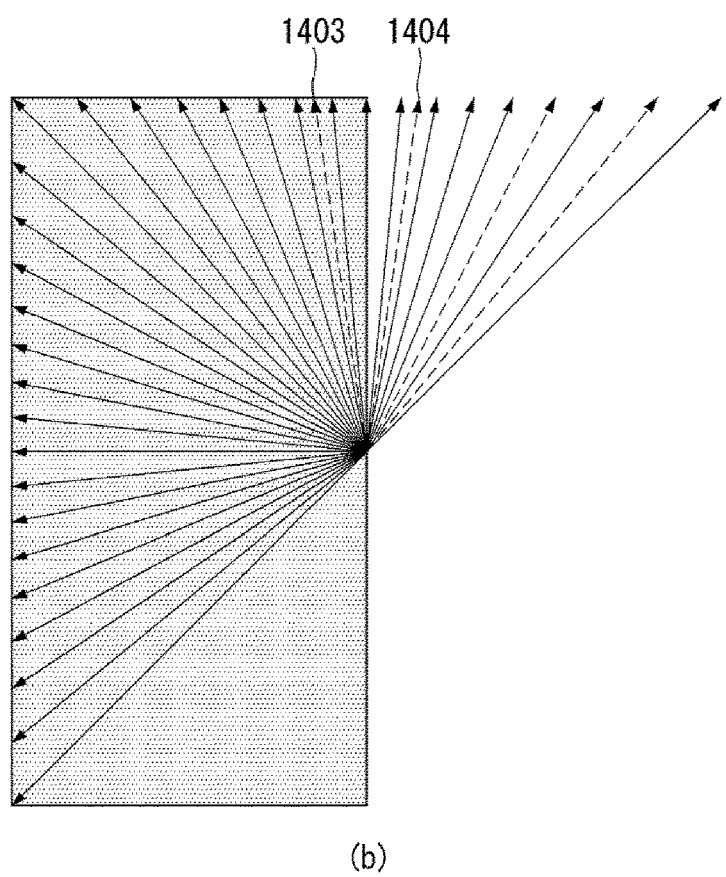
(b)

[FIG. 15]
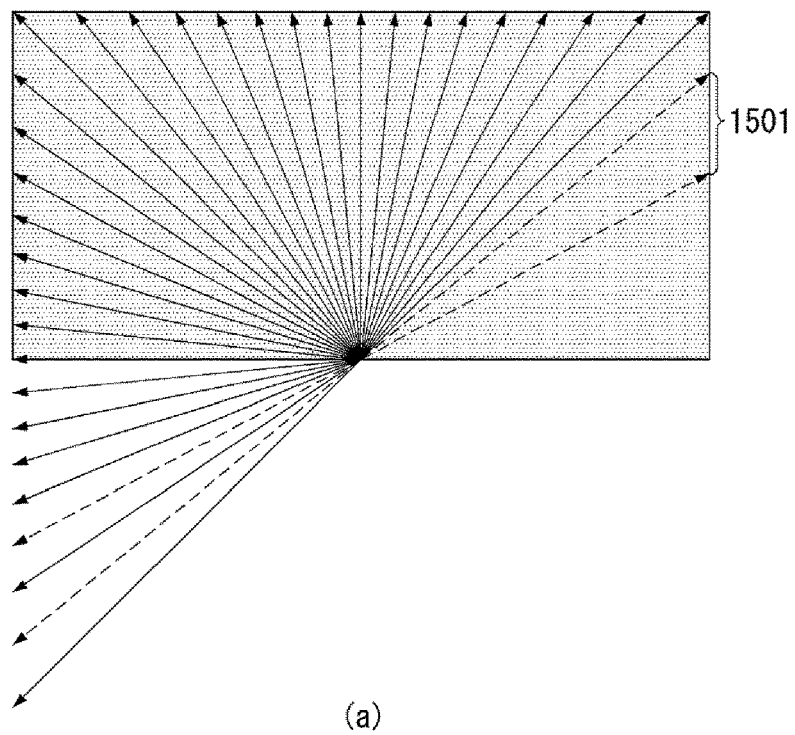
(a)
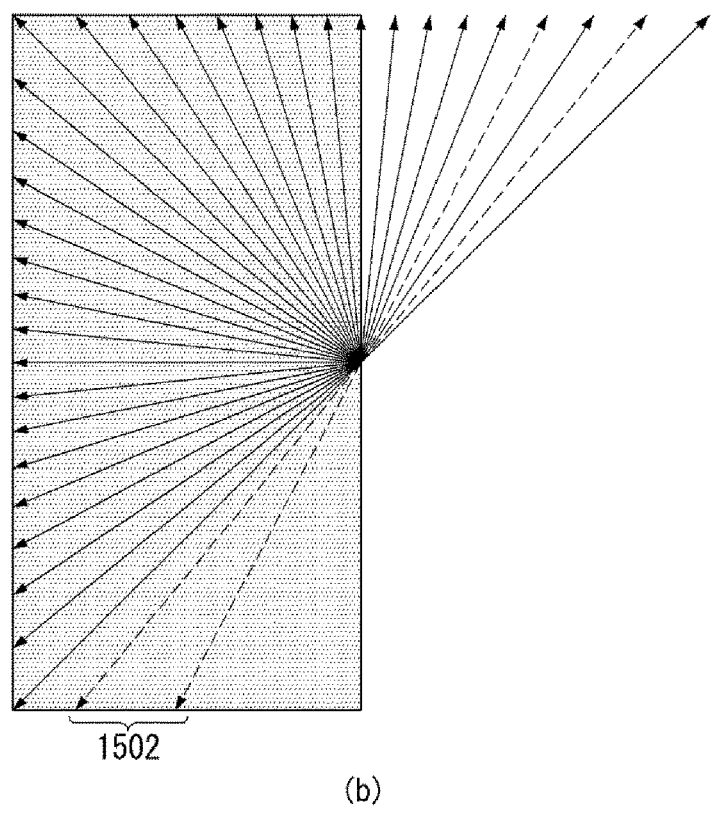
(b)

[FIG. 16]
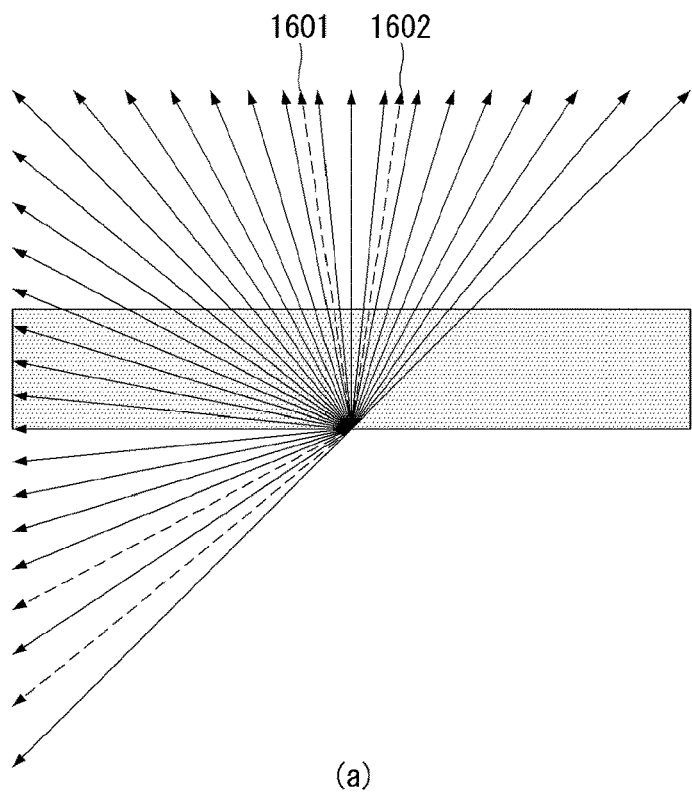
(a)
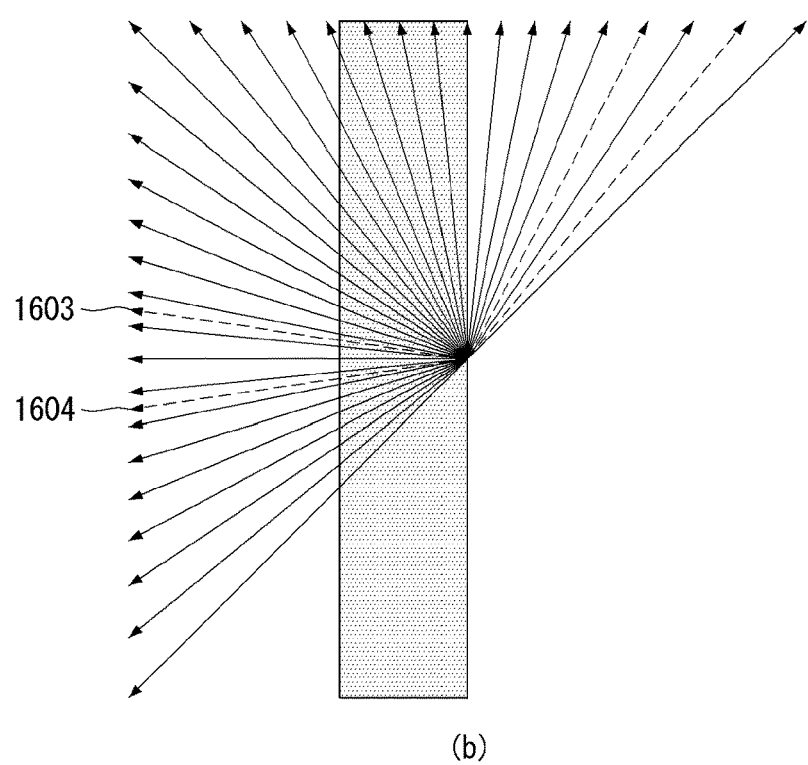
(b)

[FIG. 17]
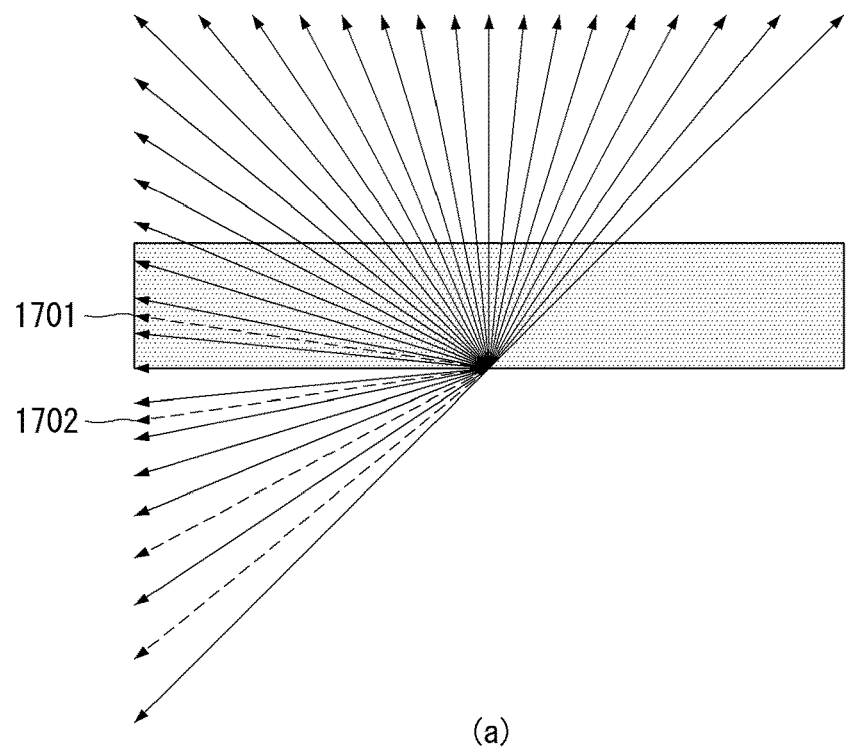
(a)
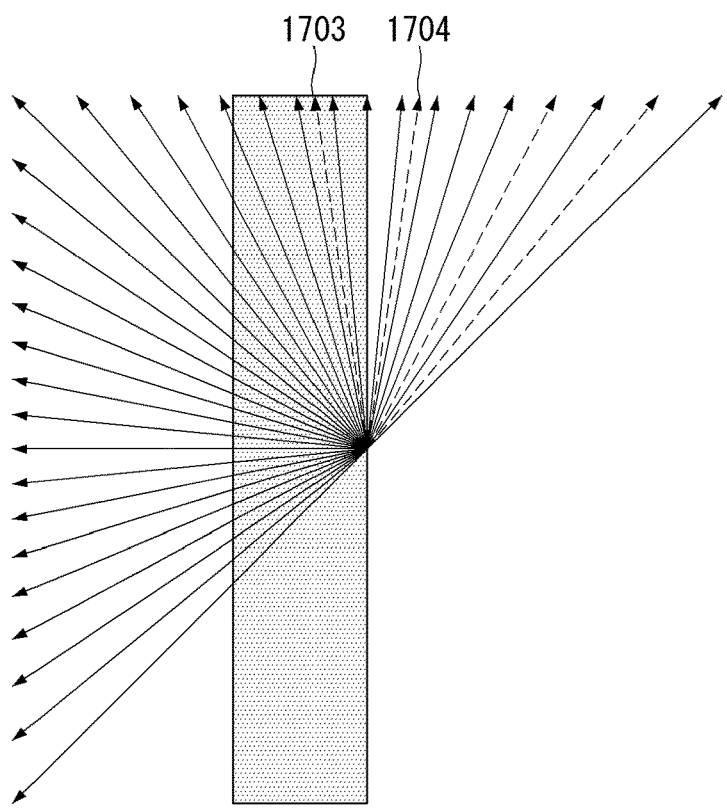
(b)

[FIG. 18]
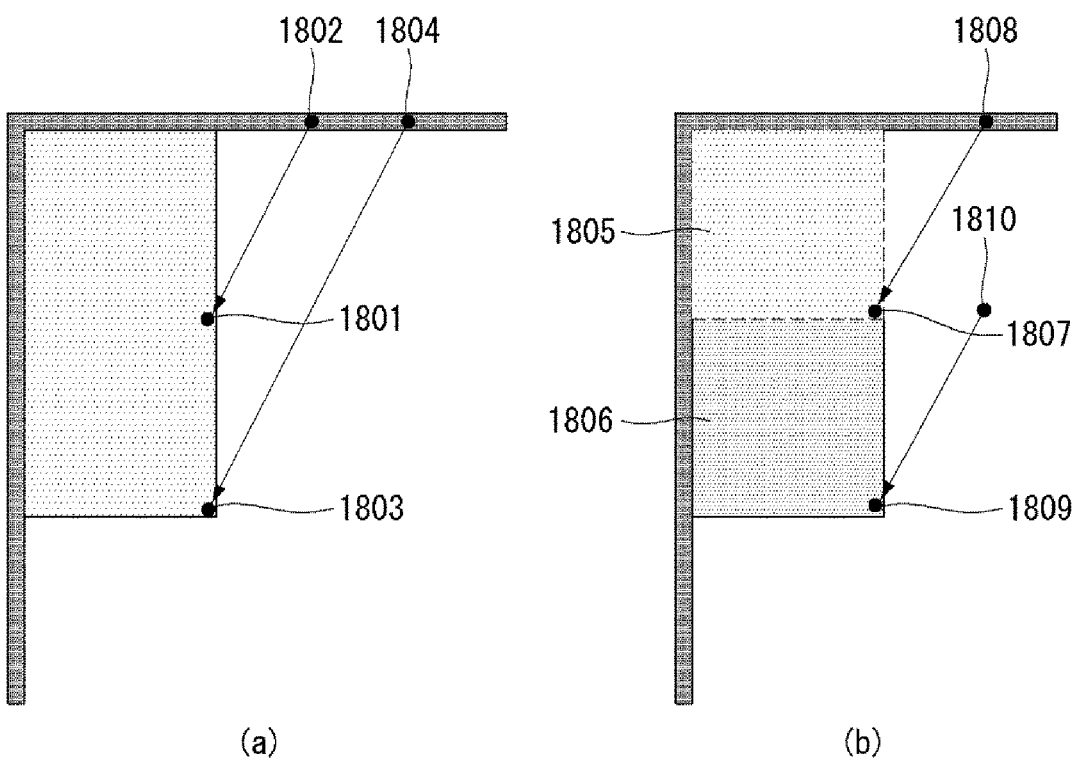
(a)　　　　　　　　　(b)

[FIG. 19]
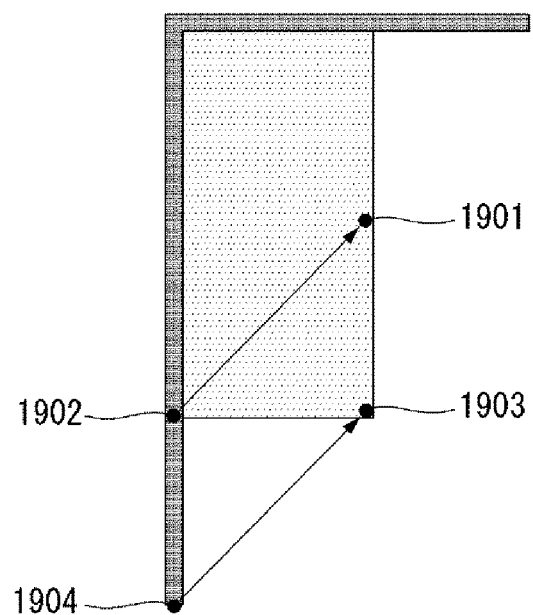

[FIG. 20]
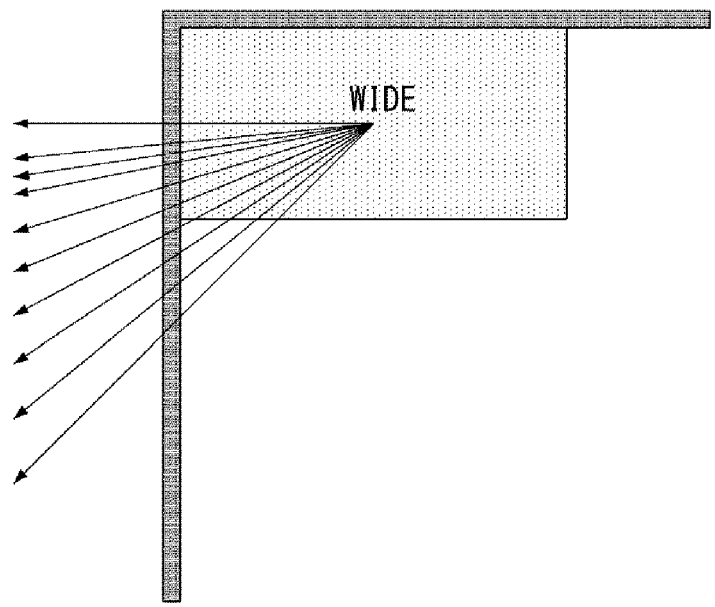
(a)
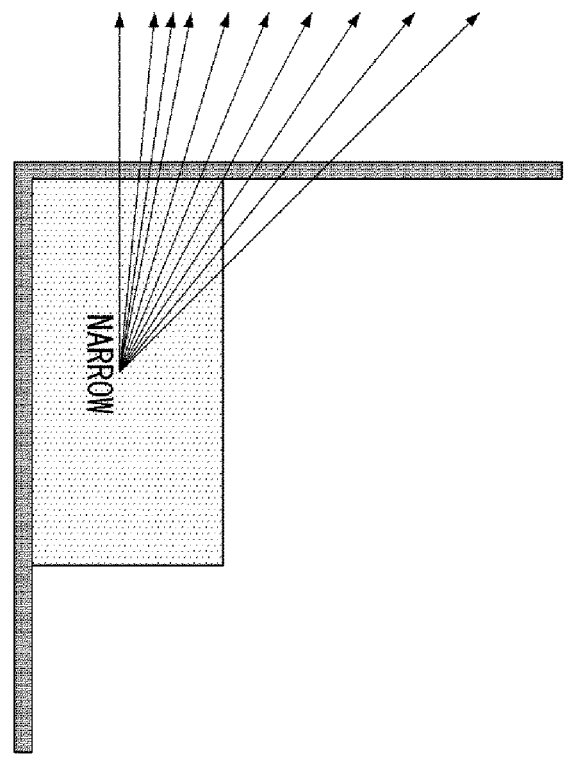
(b)

[FIG. 21]
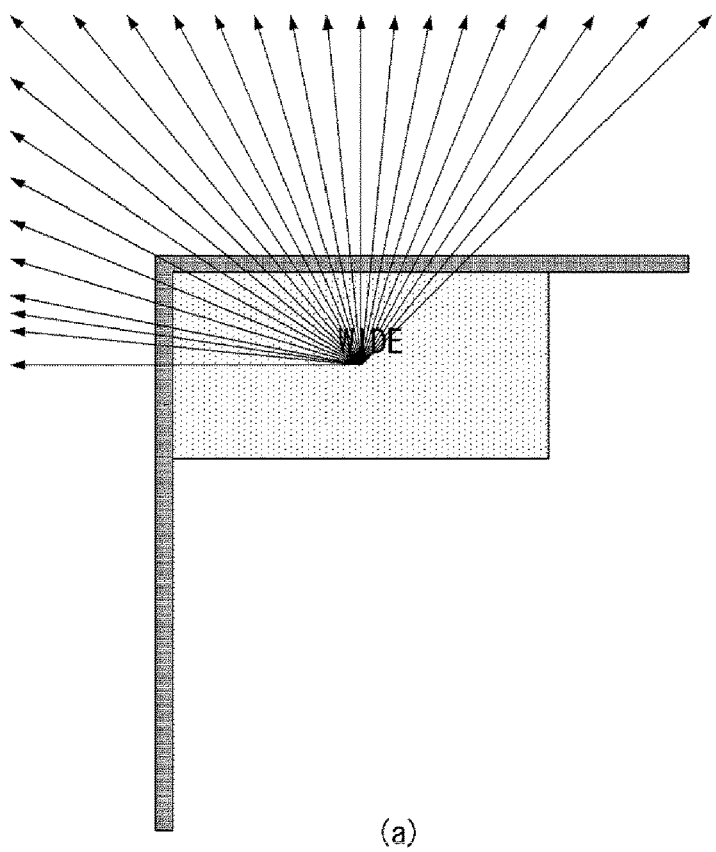
(a)
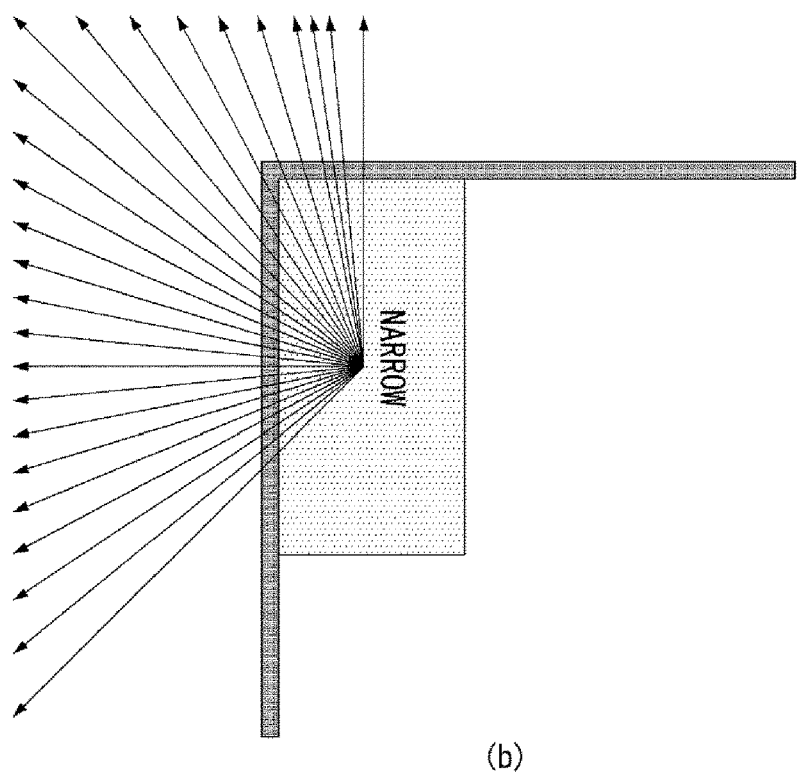
(b)

[FIG. 22]
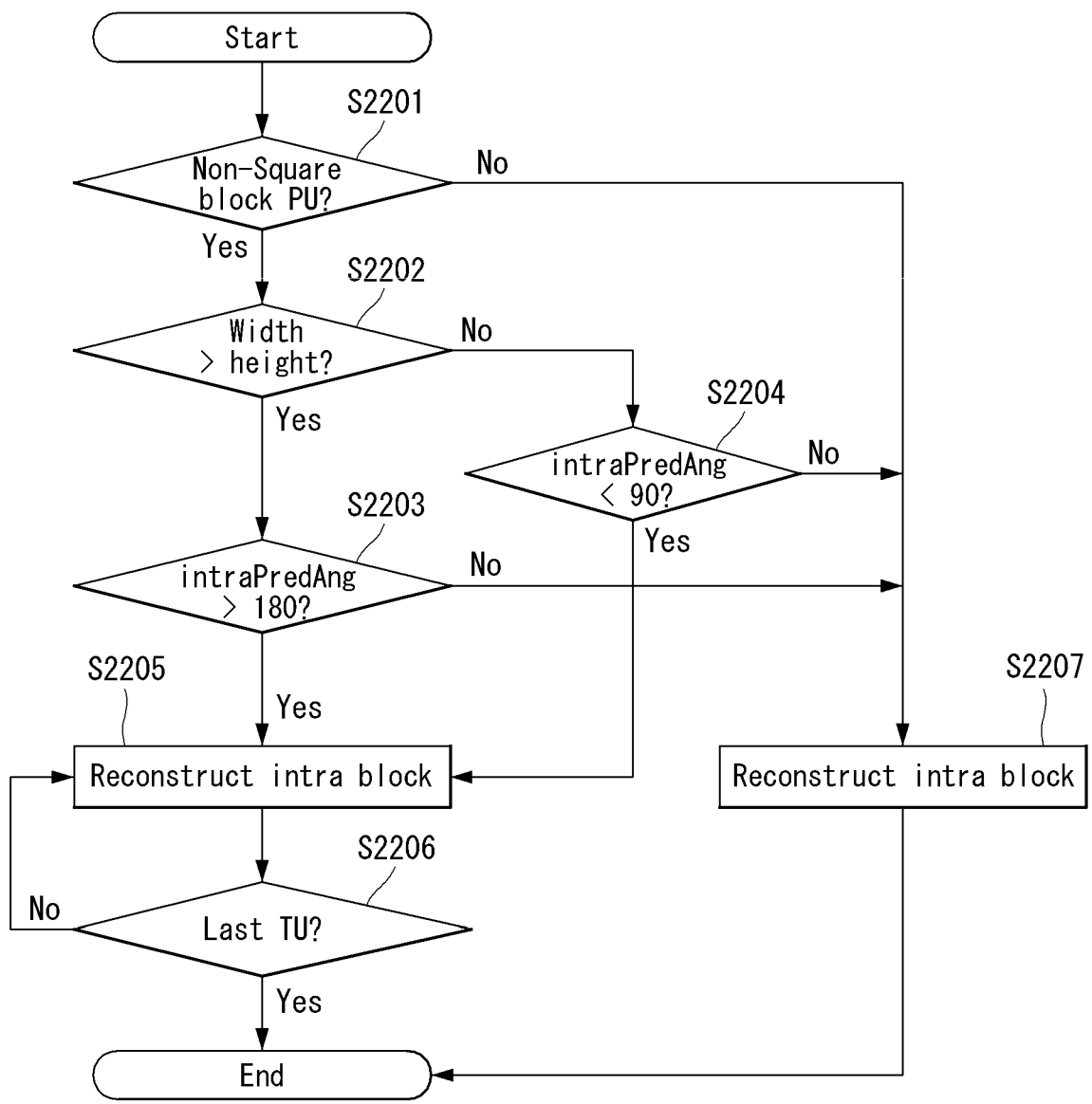

[FIG. 23]
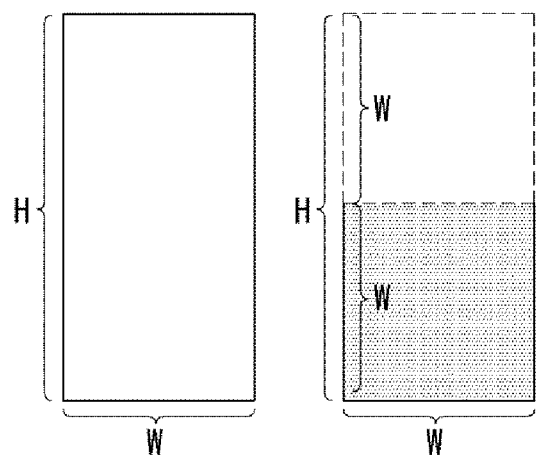
(a)
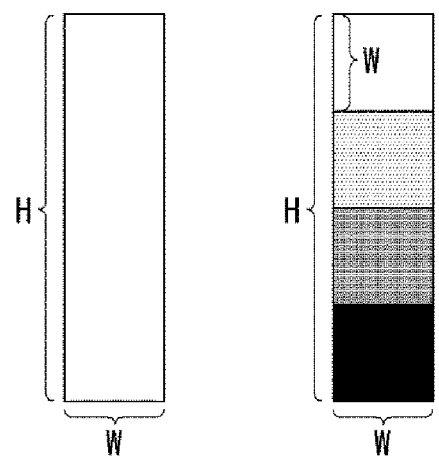
(b)

[FIG. 24]
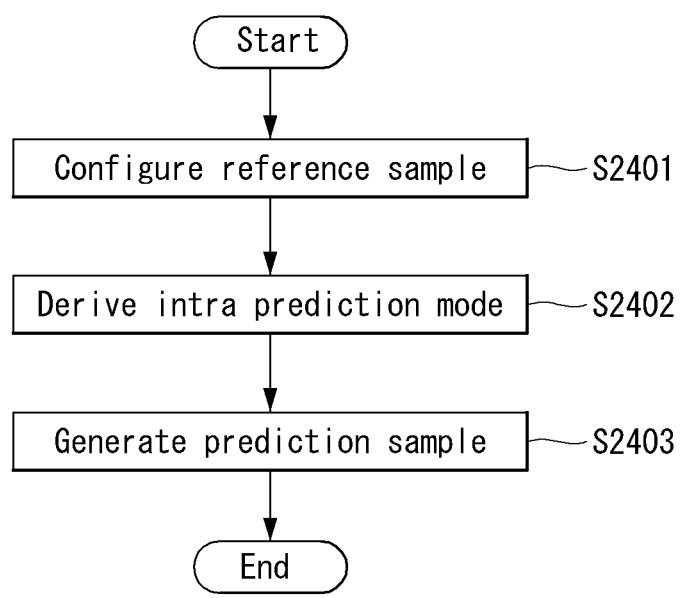

[FIG. 25]
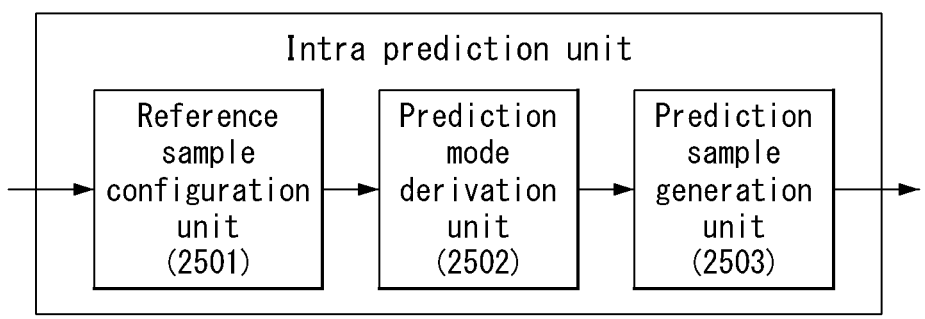

INTRA-PREDICTION MODE-BASED IMAGE PROCESSING METHOD AND DEVICE THEREFOR

CROSS-REFERENCE TO RELATED APPLICATIONS

This application is a National Stage application under 35 U.S.C. § 371 of International Application No. PCT/KR2017/001340, filed on Feb. 7, 2017, which claims the benefit of U.S. Provisional Application No. 62/372,271, filed on Aug. 8, 2016. The disclosures of the prior applications are incorporated by reference in their entirety.

TECHNICAL FIELD

The present invention relates to a method for processing a still image or moving image and, more particularly, to a method for encoding/decoding a still image or moving image based on an intra-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

The present invention proposes a method of efficiently performing prediction by taking into consideration the characteristics of a block shape when a prediction block is generated in a non-square block unit by performing prediction within a frame (or prediction within a frame).

Furthermore, the present invention proposes a method of configuring a reference sample to be used for intra prediction by taking into consideration a shape of a non-square block.

Furthermore, the present invention proposes a method of adaptively distributing the prediction direction of an intra prediction mode by taking into consideration a shape of a non-square block.

Furthermore, the present invention proposes a method of adaptively splitting a transform unit, that is, a basic unit by which transform is performed, by taking into consideration a shape of a non-square block.

Technical objects to be achieved in the present invention are not limited to the above-described technical objects, and other technical objects not described above may be evidently understood by a person having ordinary skill in the art to which the present invention pertains from the following description.

Technical Solution

In an aspect of the present invention, a method of processing video based on an intra prediction mode may include configuring a reference sample to be used for the prediction of a current block based on width and height information of the current block when the current block is a non-square block, deriving an intra prediction mode of the current block, and generating a prediction sample of the current block using the reference sample based on the intra prediction mode of the current block.

In another aspect of the present invention, an apparatus processing video based on an intra prediction mode may include a reference sample configuration unit configured to configure a reference sample to be used for the prediction of a current block based on width and height information of the current block when the current block is a non-square block, a prediction mode derivation unit configured to derive an intra prediction mode of the current block, and a prediction sample generation unit configured to generate a prediction sample of the current block using the reference sample based on the intra prediction mode of the current block.

Preferably, the step of deriving the intra prediction mode of the current block further includes the step of adaptively determining a plurality of intra prediction modes applicable to the current block based on the width and height information of the current block. The intra prediction mode of the current block may be derived among the plurality of determined intra prediction modes.

Preferably, when the width of the current block is N and the height of the current block is M, the reference sample may be configured with one sample neighboring a top left of the current block, M samples neighboring a left of the current block, N samples neighboring a bottom left of the current block, N samples neighboring a top of the current block and M samples neighboring a top right of the current block.

Preferably, the plurality of intra prediction modes applicable to the current block may be determined as intra prediction modes in which prediction directions are differentially distributed based on a ratio of the width and height of the current block.

Preferably, when the width is greater among the width and height of the current block, the plurality of intra prediction modes applicable to the current block may be determined as intra prediction modes in which the number of prediction directions is more distributed between the prediction direction of an angle of 45° and the prediction direction of an angle of 135° than between the prediction direction of the angle of 135° and the prediction of an angle of 225°.

Preferably, when the height is greater among the width and height of the current block, the plurality of intra prediction modes applicable to the current block may be determined as intra prediction modes in which the number of prediction directions is more distributed between the prediction direction of an angle of 135° and the prediction of an angle of 225° than between the prediction direction of an angle of 45° and the prediction direction of the angle of 135°.

Preferably, the plurality of intra prediction modes applicable to the current block may be determined as intra prediction modes from which a specific number of prediction directions have been removed based on a ratio of the width and height of the current block.

Preferably, the plurality of intra prediction modes applicable to the current block may be determined by sub-sampling a prediction direction of a specific angle range based on a ratio of the width and height of the current block.

Preferably, the plurality of intra prediction modes applicable to the current block may be determined as intra prediction modes from which a plurality of prediction directions has been removed based on a ratio of the width and height of the current block and to which prediction directions have been added to a specific angle range including a vertical mode or horizontal mode as many as the number of removed prediction directions.

Preferably, the plurality of intra prediction modes applicable to the current block may be determined as intra prediction modes from which a plurality of prediction directions has been removed based on a ratio of the width and height of the current block and to which prediction directions have been added between a plurality of prediction directions neighboring to a vertical mode or horizontal mode as many as the number of removed prediction directions.

Preferably, the method further includes determining whether to split the current block into a plurality of square sub-blocks based on a ratio of the width and height of the current block. If the current block is not split into a plurality of square sub-blocks, the prediction sample of the current block may be generated in a current block unit. If the current block is split into a plurality of square sub-blocks, the prediction sample of the current block may be generated in a sub-block unit. The sub-block may be identical with a transform unit transforming a residual signal of the current block.

Preferably, the method further includes splitting the current block into a plurality of square sub-blocks when the width is greater among the width and height of the current block and the angle of an intra prediction mode of the current block is greater than 180°. The prediction sample of the current block may be generated in the sub-block unit using the reference sample based on the intra prediction mode of the current block. The sub-block may be identical with a transform unit transforming a residual signal of the current block.

Preferably, the method further includes splitting the current block into a plurality of square sub-blocks when the height is greater among the width and height of the current block and the angle of the intra prediction mode of the current block is smaller than 90°. The prediction sample of the current block may be generated in the sub-block unit using the reference sample based on the intra prediction mode of the current block. The sub-block may be identical with a transform unit transforming the residual signal of the current block.

Preferably, the method further includes splitting the current block into a plurality of square sub-blocks. The prediction sample of the current block may be generated in the sub-block unit using the reference sample based on the intra prediction mode of the current block. The sub-block may be identical with a transform unit transforming the residual signal of the current block.

Advantageous Effects

In accordance with an embodiment of the present invention, intra prediction in a non-square block can be efficiently applied by configuring a reference sample to be used for prediction by incorporating a shape of a non-square block.

Furthermore, in accordance with an embodiment of the present invention, prediction performance can be improved and coding performance can be enhanced by disposing more prediction directions on the side of a direction having a less error.

Furthermore, in accordance with an embodiment of the present invention, the precision of prediction can be improved by removing a direction, having a higher prediction error, and disposing a detailed direction that may not be represented by the existing method as many as the number of removed directions.

Furthermore, in accordance with an embodiment of the present invention, the distance from a reference sample can be reduced by splitting a transform unit from a non-square block, and thus a prediction error can be effectively reduced and the precision of prediction can be improved.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention is applied and is a diagram illustrating an intra-prediction method.

FIG. 6 illustrates a prediction direction according to an intra-prediction mode.

FIG. 7 is a diagram for illustrating a split structure of a block which may be applied to the present invention.

FIG. 8 is an embodiment to which the present invention may be applied and is a diagram illustrating a method of configuring a reference sample.

FIG. 9 is an embodiment to which the present invention may be applied and is a diagram illustrating a method of configuring a reference sample.

FIG. 10 is an embodiment to which the present invention may be applied and is a diagram for illustrating a method of adaptively determining an intra prediction mode.

FIG. 11 is an embodiment to which the present invention may be applied and is a diagram illustrating a method of adaptively determining an intra prediction mode.

FIG. 12 is an embodiment to which the present invention may be applied and is a diagram illustrating a method of adaptively determining an intra prediction mode.

FIGS. 13 to 15 are embodiments to which the present invention may be applied and are diagrams illustrating a method of adaptively determining an intra prediction mode.

FIGS. 16 and 17 are embodiments to which the present invention may be applied and are diagrams illustrating a method of adaptively determining an intra prediction mode.

FIG. 18 is a diagram illustrating a split method of a transform unit according to an embodiment of the present invention.

FIG. 19 is a diagram illustrating a split method of a transform unit according to an embodiment of the present invention.

FIG. 20 is a diagram illustrating a split method of a transform unit according to an embodiment of the present invention.

FIG. 21 is a diagram illustrating a split method of a transform unit according to an embodiment of the present invention.

FIG. 22 is a flowchart illustrating a split method of a transform unit according to an embodiment of the present invention.

FIG. 23 is a diagram illustrating a split method of a transform unit according to an embodiment of the present invention.

FIG. 24 is a diagram illustrating an intra prediction method according to an embodiment of the present invention.

FIG. 25 is a diagram illustrating an intra prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present invention is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, etc. are collectively called a sample. Furthermore, to use a sample may mean to use a pixel value, a picture element value or the like.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Furthermore, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(*b*), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(*b*), a TU(c), a TU(h) and a TU(i) corresponding to the node c, h and l have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(*b*), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconfigure a current processing unit on which decoding is performed, a decoded part of a current picture or other pictures including the current processing unit may be used.

A picture (slice) using only a current picture for reconstruction, that is, on which only intra prediction is performed, may be called an intra picture or I picture (slice). A picture (slice) using a maximum of one motion vector and reference index in order to predict each unit may be called a predictive picture or P picture (slice). A picture (slice) using a maximum of two motion vectors and reference indices may be called a bi-predictive picture or B picture (slice).

Intra prediction means a prediction method of deriving a current processing block from a data element (e.g., a sample value) of the same decoded picture (or slice). That is, intra prediction means a method of predicting a pixel value of a current processing block with reference to reconstructed areas within a current picture.

Inter prediction means a prediction method of deriving a current processing block based on a data element (e.g., a sample value or a motion vector) of a picture other than a current picture. That is, inter prediction means a method of predicting a pixel value of a current processing block with reference to reconstructed areas within another reconstructed picture other than a current picture.

Hereinafter, intra prediction is described more specifically.

Intra Prediction (or Prediction within Frame)

FIG. 5 is an embodiment to which the present invention is applied and is a diagram illustrating an intra prediction method.

Referring to FIG. 5, the decoder derives an intra prediction mode of a current processing block (S501).

Intra prediction may have a prediction direction for the position of a reference sample used for prediction depending on a prediction mode. An intra prediction mode having a prediction direction is referred to as an intra-angular prediction mode (Intra_Angular prediction mode). In contrast, an intra prediction mode not having a prediction direction includes an intra planar (INTRA_PLANAR) prediction mode and an intra DC (INTRA_DC) prediction mode.

Table 1 illustrates intra-prediction modes and associated names, and FIG. 6 illustrates a prediction direction according to an intra-prediction mode.

TABLE 1

| INTRA-PREDICTION MODE | ASSOCIATED NAMES |
|---|---|
| 0 | Intra-planar (INTRA_PLANAR) |
| 1 | Intra-DC (INTRA_DC) |
| 2 . . . , 34 | intra-angular 2 . . . , intra-angular 34 (INTRA_ANGULAR2 . . . , INTRA_ANGULAR34) |

In intra-prediction, prediction is performed on a current processing block based on a derived prediction mode. A reference sample used for prediction and a detailed prediction method are different depending on a prediction mode. If a current block is an intra-prediction mode, the decoder derives the prediction mode of a current block in order to perform prediction.

The decoder checks whether neighboring samples of the current processing block can be used for prediction and constructs reference samples to be used for the prediction (S502).

In intra-prediction, neighboring samples of the current processing block mean a sample neighboring the left boundary of current processing block of an nS×nS size, a total of 2×nS samples neighboring a bottom left of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been coded or may not be available. In this case, the decoder may construct reference samples to be used for prediction by substituting unavailable samples with available samples.

The decoder may perform filtering on the reference samples based on the intra-prediction mode (S503).

Whether or not to perform the filtering of the reference samples may be determined based on the size of the current processing block. Furthermore, the filtering method of the reference samples may be determined based on a filtering flag transferred by the encoder.

The decoder generates a prediction block for the current processing block based on the intra prediction mode and the reference samples (S504). That is, the decoder generates a prediction block for the current processing block (i.e., generates a prediction sample within the current processing block) based on the intra prediction mode derived in the intra prediction mode derivation step (S501) and the reference samples obtained in the reference sample configuration step (S502) and the reference sample filtering step (S503).

If a current processing block has been encoded in the INTRA_DC mode, in order to minimize the discontinuity of the boundary between processing blocks, a left boundary sample (i.e., a sample within a prediction block neighboring a left boundary) and top boundary sample (i.e., a sample within a prediction block neighboring a top boundary) of the prediction block may be filtered at step S504.

Furthermore, at step S504, with respect to the vertical mode and horizontal mode of intra-angular prediction modes, as in the INTRA_DC mode, filtering may be applied to a left boundary sample or a top boundary sample.

More specifically, if a current processing block has been encoded in the vertical mode or horizontal mode, a value of a prediction sample may be derived based on a value of a reference sample positioned in the prediction direction. In this case, a boundary sample not positioned in the prediction direction among a left boundary sample or top boundary sample of a prediction block may neighbor a reference sample not used for prediction. That is, the distance from a reference sample not used for prediction may be much closer than the distance from a reference sample used for prediction.

Accordingly, the decoder may adaptively apply filtering to left boundary samples or top boundary samples depending on whether an intra prediction direction is a vertical direction or a horizontal direction. That is, the decoder may apply filtering to left boundary samples if the intra prediction direction is a vertical direction, and may apply filtering to top boundary samples if the intra prediction direction is a horizontal direction.

Quadtree Plus Binary Tree (QTBT)

A QTBT refers to a block structure in which a block is split using a quad-tree method and additional split is then performed using a binary tree method.

Specifically, in the QTBT block split structure, after block split is performed in a quad-tree shape as in the existing method, split is additionally performed in a binary tree shape through the signaling of split flag information.

FIG. 7 is a diagram for illustrating a split structure of a block which may be applied to the present invention.

FIG. 7 illustrates a block split structure of a QTBT structure. A block divided by a solid line indicates a block split in a quad-tree structure, that is, a quad-tree shape. In this case, the quad-tree structure may be split using a method, such as the method described in FIG. 3.

Furthermore, a block divided by a dotted line indicates a block split in a binary tree structure, that is, a binary tree shape. Additional split may be performed in a binary tree structure based on the block structure split in a quad-tree shape.

Specifically, after quad-tree block split is performed, the encoder may split a block in a binary tree structure by signaling a split flag and a flag indicating horizontal direction split or vertical direction split.

In accordance with the QTBT block structure, there may be a block of a rectangle (i.e., a non-square) shape other than a block of a regular quadrilateral (i.e., square) shape depending on the characteristics of video. Furthermore, transform in addition to prediction may be performed based on the finally split block.

That is, in the existing HEVC, in intra prediction, the prediction of a PU unit and the transform and quantization of a TU unit are performed in a square block. In contrast, in intra prediction of a QTBT block structure, intra prediction may be performed in a rectangular block in addition to a regular quadrilateral block, and prediction, transform and quantization may be performed based on a split block without the existing hierarchical structure of a PU or TU.

Intra Prediction Mode-Based Video Processing Method

As described above, if prediction within a frame (or intra prediction) is performed based on a QTBT block structure, unlike in the existing HEVC, intra prediction may be performed in a non-square block in addition to a square block.

The present invention proposes a method of efficiently performing prediction by taking into consideration the characteristics of a block shape when a prediction block is generated in a non-square block unit through intra prediction.

Embodiment 1

As described in FIG. 5, the encoder/decoder may identify whether samples neighboring a current block can be used for prediction in order to perform intra prediction, and may configure reference samples to be used for prediction.

If intra prediction is performed in a square block, as in the existing HEVC, a sample neighboring the left boundary of a current block of an N×N size and a total of 2×N samples neighboring the bottom left of the current block, a sample neighboring the top boundary of the current block and a total of 2×N samples neighboring the top right of the current block and one sample neighboring the top left of the current block may be configured as reference samples to be used for prediction.

Furthermore, if some of the surrounding samples of the current block has not yet been decoded or is not available, the encoder/decoder may configure reference samples to be used for prediction by substituting unavailable samples with available samples.

In contrast, as described above, intra prediction may be performed in a non-square block in addition to a square block.

Accordingly, the present embodiment proposes a method of configuring (or padding) a reference sample to be used for intra prediction by taking into consideration a shape of a non-square block.

FIG. 8 is an embodiment to which the present invention may be applied and is a diagram illustrating a method of configuring a reference sample.

Referring to FIG. 8(a), the prediction direction of an intra prediction mode may have an angle of 45° to 225°. However, this is merely an example for illustrating the present invention based on the existing intra prediction mode (refer to FIG. 6), and an intra prediction mode to which the present invention may be applied is not limited thereto.

In an intra prediction method of a non-square block, in order to identically apply the direction of an intra prediction mode applied to the existing square block, a reference sample may be configured (or prepared) by taking into consideration the horizontal length (i.e., width) and vertical length (i.e., height) of a current block.

That is, the encoder/decoder may configure a reference sample to be used for the prediction of a current block by taking into consideration the prediction direction of an intra prediction mode having an angle of 45° to 225° and the width and height of the current block.

Referring to FIG. 8(b), a case where the width of a current block, that is, a non-square block, is W and the height t hereof is H is assumed.

For example, if intra prediction is performed in the current block, one sample neighboring the top left of the current block, H samples neighboring the left of the current block, W samples neighboring the bottom left of the current block, W samples neighboring the top of the current block and H samples neighboring the top right of the current block may be configured as reference samples to be used for prediction.

Furthermore, if some of the surrounding samples of the current block has not yet been decoded or is not available, the encoder/decoder may configure reference samples to be used for prediction by substituting unavailable samples with available samples.

Furthermore, the encoder/decoder may pad a reference sample and then perform filtering on the reference sample using the method described in FIG. 5.

FIG. 9 is an embodiment to which the present invention may be applied and is a diagram illustrating a method of configuring a reference sample.

From FIG. 9, a maximum reference sample area necessary for intra prediction may be seen if intra prediction is performed in a non-square block.

Specifically, referring to FIG. 9(a), a case where the prediction direction of an intra prediction mode is an angle of 45° is assumed. When the width of a current block 901 is W and the height thereof is H, a prediction sample of the current block 901 may be generated using W samples neighboring the top of the current block 901 and H samples neighboring the top right of the current block 901.

Referring to FIG. 9(b), a case where the prediction direction of an intra prediction mode is an angle of 225° is assumed. When the width of a current block 902 is W and the height thereof is H, a prediction sample of the current block 902 may be generated using H samples neighboring the left of the current block 902 and W samples neighboring the bottom left of the current block 902.

Embodiment 2

In intra prediction, a sample value of a reference sample is duplicated depending on a direction of an intra prediction mode. Accordingly, when the distance between a prediction sample and the reference sample increases, the precision of prediction may be degraded compared to a sample whose distance from a reference sample is not increased. Furthermore, as the distance between a prediction sample and a reference sample increases, a prediction error may increase, and thus compression performance may be degraded due to an increased residual signal.

A problem occurring depending on the prediction direction of an intra prediction mode in a non-square block is described.

Referring back to FIG. 9(a), the distance from a reference sample is different depending on the position of a prediction sample within the current block 901 (or the prediction block of the current block 901) in the same prediction direction (i.e., an angle of 45°).

Specifically, the distance between a top-right sample of the current block 901 and the reference sample is close. In contrast, the distance between a bottom-right sample of the current block 901 and the reference sample is relatively distant. That is, each prediction sample within the current block 901 may have different precision of prediction depending on its position because prediction is performed using a reference sample positioned at the start point of each arrow shown in FIG. 9(a).

Furthermore, a prediction error occurs as the distance between each prediction sample of the current block 901 and a reference sample becomes distant. Accordingly, the precision of prediction may be degraded as the distance from the reference sample becomes distant because the prediction sample is generated using a sample of a transferred state.

In contrast, referring back to FIG. 9(b), it may be seen that if prediction is performed in a prediction direction of an angle of 225° symmetrical to an angle of 45° with respect to a prediction direction of an angle of 135° (i.e., No. 18 prediction mode in HEVC, for example), each prediction sample within the current block 902 has a same prediction error according to the distance from a reference sample.

In other words, unlike in the prediction direction of an angle of 45° in FIG. 9(a), in the current block 902, a prediction sample having the same vertical coordinate may have the same prediction error according to the distance from a reference sample because the prediction sample has a constant distance from the reference sample.

Furthermore, a prediction error may relatively less occur because the distance between the prediction sample and the reference sample is closer compared to the case of the prediction direction of an angle of 45°.

That is, if intra prediction is performed in a non-square block having the same shape, a different prediction error may occur depending on the direction of an intra prediction mode. Accordingly, the probability that a prediction direction having a less prediction error may be selected as an intra prediction mode may be higher because the prediction direction of an intra prediction mode may have different prediction performance.

Accordingly, the present embodiment proposes a method of adaptively redistributing (or distributing or determining) the prediction direction of an intra prediction mode by taking into consideration a non-square block.

In the existing intra prediction method, all prediction directions are uniformly (i.e., to have the same density) disposed. In contrast, a method proposed in the present embodiment can maximize prediction performance by disposing more prediction directions on the side of a direction having a less error.

FIG. 10 is an embodiment to which the present invention may be applied and is a diagram for illustrating a method of adaptively determining an intra prediction mode.

Referring to FIG. 10, FIG. 10(a) illustrates a distribution method of intra prediction modes according to the existing method, and FIG. 10(b) illustrates a distribution method of intra prediction modes according to a method proposed in the present embodiment.

Referring to FIG. 10(a), according to the existing method, prediction directions uniform with respect to a direction symmetrical with respect to the prediction direction of an angle of 135° are used as intra prediction modes.

In contrast, referring to FIG. 10(b), according to the method proposed in the present embodiment, more prediction directions may be used on the side of a direction having a longer length of the width and height of a current block among directions symmetrical with respect to the prediction direction of an angle of 135°.

In other words, if the width is greater among the width and height of a current block, a more number of prediction directions may be distributed between the prediction direction of an angle of 45° and the prediction direction of an angle of 135° than between the prediction direction of the angle of 135° and the prediction direction of an angle of 225°. If the height is greater among the width and height of a current block, a more number of prediction directions may be distributed between the prediction direction of an angle of 135° and the prediction direction of an angle of 225° than between the prediction direction of an angle of 45° and the prediction direction of the angle of 135°.

Accordingly, the present embodiment proposes a method of differentially distributing the prediction direction (i.e., angle) of an intra prediction mode depending on the width and height in block structures having various width (horizontal) and height (vertical) ratios as in a QTBT block structure.

Hereinafter, the present embodiment is described based on a case where the existing intra prediction mode is used (or applied) without any change, but the present invention is not limited thereto. Accordingly, a method proposed in the present embodiment may also be applied to a case where the existing intra prediction mode is not used without any change.

Hereinafter, various methods of adaptively determining an intra prediction mode are described as examples.

As described above, if intra prediction is performed in a non-square block, the distance between a prediction sample and a reference sample within a current block may be different depending on the prediction direction of an intra prediction mode. Furthermore, as the distance from the reference sample becomes distant, a prediction error may rise and the precision of prediction may be degraded.

Accordingly, the encoder/decoder can reduce bits for representing an intra prediction mode in an encoding/decoding process by removing a specific number of prediction directions from the prediction directions of intra prediction modes based on the width and height ratio of a current block in the prediction directions of the intra prediction modes.

FIG. 11 is an embodiment to which the present invention may be applied and is a diagram illustrating a method of adaptively determining an intra prediction mode.

Referring to FIG. 11(a), a case where the width (or horizontal) and height (or vertical) ratio of a current block is 2:1 is assumed.

In this case, as described above, the prediction direction of an angle of 225° may have a higher prediction error according to the distance from a reference sample than the prediction direction of an angle of 45°. Accordingly, the encoder/decoder may redistribute intra prediction modes by removing the prediction direction of the angle of 225° and two prediction directions neighboring the prediction direction of the angle of 225°, that is, a total of three prediction directions 1101, from the existing intra prediction modes.

Referring to FIG. 11(b), a case where the width (or horizontal) and height (or vertical) ratio of a current block is 1:2 is assumed.

In this case, as described above, the probability that the prediction direction of an angle of 45° has a higher prediction error according to the distance from a reference sample than the prediction direction of an angle of 225° may occur. Accordingly, the encoder/decoder may redistribute intra prediction modes by removing the prediction direction of the angle of 45° and two prediction directions neighboring the prediction direction of the angle of 45°, that is, a total of three prediction directions 1102, from the existing intra prediction modes.

In this case, a case where the number of removed intra prediction modes is 3 is assumed and described, for convenience of description, but this is only one example and the present invention is not limited thereto.

FIG. 12 is an embodiment to which the present invention may be applied and is a diagram illustrating a method of adaptively determining an intra prediction mode.

Referring to FIG. 12 (a), a case where the width (or horizontal) and height (or vertical) ratio of a current block is 2:1 is assumed.

In this case, as described above, the probability that the prediction direction of an angle of 225° has a higher prediction error according to the distance from a reference sample than the prediction direction of an angle of 45° may occur. Accordingly, the encoder/decoder may redistribute intra prediction modes in such a manner that three prediction directions are sequentially removed from the existing intra prediction modes by sub-sampling or down-sampling the prediction directions with respect to the prediction direction of the angle of 225°.

In other words, the intra prediction modes may be redistributed by removing a total of three prediction directions for each prediction direction having a smaller angle every two prediction directions with respect to the prediction direction of the angle of 225°.

Referring to FIG. 12(b), a case where the width (or horizontal) and height (or vertical) ratio of a current block is 1:2 is assumed.

In this case, as described above, the probability that the prediction direction of an angle of 45° has a higher prediction error according to the distance from a reference sample than the prediction direction of an angle of 225° may occur. Accordingly, the encoder/decoder may redistribute intra prediction modes in such a manner that three prediction directions are sequentially removed from the existing intra prediction mode by sub-sampling or down-sampling the prediction directions with respect to the prediction direction of the angle of 45°.

In other words, the encoder/decoder may redistribute the intra prediction modes by removing a total of three prediction direction for each prediction direction having a greater angle every two prediction directions with respect to the prediction direction of the angle of 45°.

In this case, a case where the number of removed intra prediction modes is 3 is assumed and described, for convenience of description, but this is only one example and the present invention is not limited thereto. Furthermore, a case where the sub-sampling or down-sampling ratio is 1/2 is assumed and described, but this is only one example and the present invention is not limited thereto.

In this case, the ratio means the ratio of a distribution degree (or density) of prediction directions before sub-sampling or down-sampling is applied and a distribution degree (or density) of prediction directions after sub-sampling or down-sampling is applied within a specific angle range from which prediction directions are removed.

In order to reduce bits representing a prediction direction through a method of removing a specific number of prediction directions from the prediction directions of intra prediction modes described in FIGS. 11 and 12, a total of 16 directions must be removed on the basis of the 33 types of directions in HEVC. A prediction direction removed by the method described in FIG. 11 or 12 may be positioned as a direction that cannot be represented by the existing prediction direction because the removal of the 16 directions may degrade coding efficiency as described above.

That is, by subdividing and representing prediction directions of a specific angle range corresponding to the number of removed directions, bits used for the encoding of an intra prediction mode can be maintained, a detailed direction that cannot be represented in a conventional technology can be represented, and thus prediction performance can be improved.

FIGS. 13 to 15 are embodiments to which the present invention may be applied and are diagrams illustrating a method of adaptively determining an intra prediction mode.

Hereinafter, in FIGS. 13 to 15, a case where a sub-sampling or down-sampling ratio is 1/2 is assumed, for convenience of description, but this is only one example and the present invention is not limited thereto. That is, the sub-sampling or down-sampling ratio may be performed at any ratio.

Furthermore, in FIGS. 13 to 15, a case where two prediction modes are removed by the method described in FIG. 12 is assumed, for convenience of description, but this is only one example and the present invention is not limited thereto. A prediction mode may be removed by the method described in FIG. 11, and two or less or two or more prediction modes may be removed.

Referring to FIG. 13(a), if the width and height ratio of a current block is 2:1 and two prediction directions have been removed from the prediction directions of intra prediction modes, the encoder/decoder may position one prediction direction 1301 of the two prediction directions between two prediction directions neighboring the left of a vertical mode, and may position the other prediction direction 1302 between two prediction directions neighboring the right of the vertical mode.

The precision of prediction can be improved by removing a prediction direction having a relatively higher probability of a prediction error and adding a prediction direction that cannot be represented by the prediction direction of the existing intra prediction mode.

Likewise, referring to FIG. 13(b), if the width and height ratio of a current block is 1:2 and two prediction directions have been removed among the prediction directions of intra prediction modes, the encoder/decoder may position one prediction direction 1303 of the two prediction directions between two prediction directions neighboring the top of a horizontal mode, and may position the other prediction direction 1304 between two prediction directions neighboring the bottom of the horizontal mode.

Although not shown in FIG. 13, the encoder/decoder may distribute prediction modes by disposing the two removed prediction directions between a prediction direction of the horizontal mode or vertical mode and a prediction direction closest to each prediction direction.

Referring to FIG. 14(a), if the width and height ratio of a current block is 2:1 and two prediction directions have been removed among the prediction directions of intra prediction modes, the encoder/decoder may position one prediction direction 1401 of the two prediction directions between two prediction directions neighboring the top of a horizontal mode, and may position the other prediction direction 1402 between two prediction directions neighboring the bottom of the horizontal mode.

The precision of prediction can be improved by removing a prediction direction having a relatively higher probability of a prediction error and adding a prediction direction that cannot be represented by the prediction direction of the existing intra prediction mode as described above.

Likewise, referring to FIG. 14(b), if the width and height ratio of a current block is 1:2 and two prediction directions have been removed among the prediction directions of intra prediction modes, the encoder/decoder may position one prediction direction 1403 of the two prediction directions between two prediction directions neighboring the left of a vertical mode, and may position the other prediction direction 1404 between two prediction directions neighboring the right of the vertical mode.

Although not shown in FIG. 14, prediction modes may be distributed by disposing the two prediction directions between the prediction direction of the horizontal mode or the vertical mode and a prediction direction closest to each prediction direction.

Referring to FIG. 15(a), if the width and height ratio of a current block is 2:1 and two prediction directions have been removed from the prediction directions of intra prediction modes, the encoder/decoder may dispose two prediction directions 1501 in a prediction direction of an angle of 45° or less.

The precision of prediction can be improved by removing a prediction direction having a relatively higher probability of a prediction error and adding a prediction direction that cannot be represented by the prediction direction of the existing intra prediction mode.

If a prediction direction of an angle of 45° or less is used as described above, the range of reference samples that may be used for prediction may be different. That is, when the width of a current block, that is, a non-square block, is W and the height thereof is H, reference samples may be configured (or padded) using a larger number of samples than H samples (refer to FIG. 8(b)) as samples neighboring the top right of the current block depending on an angle of a prediction direction.

Likewise, referring to FIG. 15(b), if the width and height ratio of a current block is 1:2 and two prediction directions have been removed among the prediction directions of intra prediction modes, the encoder/decoder may dispose two prediction directions 1502 in a prediction direction of an angle 225° or more.

If a prediction direction of an angle of 225° or more is used as described above, the range of reference samples that may be used for prediction may be different. That is, when the width of a current block, that is, a non-square block, is W and the height is H, reference samples may be configured (or padded) using a larger number of samples than W samples (refer to FIG. 8(b)) as samples neighboring the bottom left of the current block depending on an angle of a prediction direction.

The methods of adaptively distributing intra prediction modes have been described assuming a case where the width and height ratio of a current block is 2:1 or 1:2. The invention proposed in this specification may be identically applied to other cases in addition to the above-described ratios. This is described with reference to the following drawings.

FIGS. 16 and 17 are embodiments to which the present invention may be applied and are diagrams illustrating a method of adaptively determining an intra prediction mode.

In FIGS. 16 and 17, a case where the width and height ratio of a current block is N:M or M:N is assumed (in this case, N>M). As described above, in the QTBT block structure, blocks having various width and height ratios may be determined.

Accordingly, a method proposed in the present embodiment may be applied to non-square blocks of all shapes which may be determined in such a block structure.

Hereinafter, in FIGS. 16 and 17, a case where a sub-sampling or down-sampling ratio is 1/2 is assumed, for convenience of description, but this is only one example and the present invention is not limited thereto. That is, the sub-sampling or down-sampling ratio may be performed at any ratio.

Furthermore, in FIGS. 16 and 17, a case where two prediction modes are removed using the method described in FIG. 12 is assumed, for convenience of description, but this is only one example and the present invention is not limited thereto. A prediction mode may be removed using the method described in FIG. 11, and two or less or two or more prediction modes may be removed.

Referring to FIG. 16(a), if the width and height ratio of a current block is N:M and two prediction directions have been removed among the prediction directions of intra prediction modes, the encoder/decoder may position one prediction direction 1601 of the two prediction directions between two prediction directions neighboring the left of a vertical mode, and may position the other prediction direction 1602 between two prediction directions neighboring the right of the vertical mode.

The precision of prediction can be improved by removing a prediction direction having a relatively higher probability of a prediction error and adding a prediction direction that cannot be represented by the prediction direction of the existing intra prediction mode.

Likewise, referring to FIG. 16(b), if the width and height ratio of a current block is M:N and two prediction directions have been removed among the prediction directions of intra prediction modes, the encoder/decoder may position one prediction direction 1603 of the two prediction directions between two prediction directions neighboring the top of a horizontal mode, and may position the other prediction direction 1604 between two prediction directions neighboring the bottom of the horizontal mode.

Although not shown in FIG. 16, prediction modes may be distributed by disposing the two removed prediction directions between a prediction direction of the horizontal mode or vertical mode and a prediction direction closest to each prediction direction.

Referring to FIG. 17(a), if the width and height ratio of a current block is N:M and two prediction directions have been removed among the prediction directions of intra prediction modes, the encoder/decoder may position one prediction direction 1701 of the two prediction directions between two prediction directions neighboring the top of a horizontal mode, and may position the other prediction direction 1702 between two prediction directions neighboring the bottom of the horizontal mode.

The precision of prediction can be improved by removing a prediction direction having a relatively higher probability of a prediction error and adding a prediction direction that cannot be represented by the prediction direction of the existing intra prediction mode as described above.

Likewise, referring to FIG. 17(b), if the width and height ratio of a current block is M:N and two prediction directions have been removed among the prediction directions of intra prediction modes, the encoder/decoder may position one prediction direction 1703 of the two prediction directions between two prediction directions neighboring the left of a vertical mode, and may position the other prediction direction 1704 between two prediction directions neighboring the right of the vertical mode.

Although not shown in FIG. 17, the encoder/decoder may distribute prediction modes by disposing the two removed prediction directions between a prediction direction of the horizontal mode or the vertical mode and a prediction direction closest to each prediction direction.

Embodiment 3

The present embodiment proposes a method of splitting a transform unit based on the direction of an intra prediction mode and a shape of a block without adding a separate syntax by taking into consideration a non-square block.

Hereinafter, in the description of the present invention, a unit by which transform is performed is denoted as a transform unit (TU), for convenience of description, but the present invention is not limited thereto. That is, a basic unit by which the transform of a residual signal is performed may be referred to as a different name other than the TU unit As described in Embodiment 2, if prediction is performed in a non-square block, a prediction error may be different depending on the prediction direction of an intra prediction mode.

When such a problem is taken into consideration, coding efficiency of a coding structure in which prediction, transform, quantization, etc. are performed in the same block structure regardless of a TU and a PU, such as the QTBT is inevitably degraded.

Accordingly, the present invention proposes a split method of a TU in order to solve the above-described problem occurring in a non-square block. Furthermore, the present invention proposes a method of improving coding efficiency by determining the split of a TU without adding a separate syntax and performing an intra prediction mode.

In the QTBT structure, a CU, a PU, and a TU are not classified, but in a method proposed in the present embodiment, a TU is split using a difference in the width (or horizontal) and height (or vertical) of a non-square block.

If intra prediction is performed in a non-square block, the encoder/decoder may adaptively determine the spit of a TU by taking into consideration the direction of an intra prediction mode.

FIG. 18 is a diagram illustrating a split method of a transform unit according to an embodiment of the present invention.

In FIG. 18, it is assumed that a current block is a block having a height longer than a width among non-square blocks.

Referring to FIG. 18(a), if the split of a TU is not present, a sample 1801 located on the center right of a current block refers to a first reference sample 1802 determined based on an intra prediction mode shown in FIG. 18(a). Furthermore, a sample 1803 located on the bottom right of the current block refers to a second reference sample 1804 determined based on an intra prediction mode.

The distance between the sample 1803 located on the bottom right of the non-square current block and the second reference sample 1804 is farther than the distance between the sample 1801 located on the right of the center and the second reference sample 1804. In such a case, as described above, a prediction error is increased, and the precision of prediction may be degraded. Accordingly, the encoder/decoder may adaptively perform the split of a TU by taking such a problem into consideration.

FIG. 18(b) illustrates a case where a current block, that is, a non-square block, is split into two square TUs.

That is, the encoder/decoder may split the current block into the square TUs based on the direction of an intra prediction mode in order to solve the problem of FIG. 18(a).

A bottom-right sample 1807 within a top TU 1805 refers to a first reference sample 1808. In this case, the distance from the reference sample 1808 is the same as that of the case of FIG. 18(a).

In contrast, it may be seen that a bottom-right sample 1809 within a bottom TU 1806 refers to a second reference sample 1810, and thus the distance between the bottom-right sample 1809 and the reference sample 1810 is reduced compared to the case of FIG. 18(a) (i.e., when the split of a TU is not present).

Furthermore, actual prediction and reconfiguration may be performed in a TU unit split in an intra prediction mode.

FIG. 19 is a diagram illustrating a split method of a transform unit according to an embodiment of the present invention.

A sample 1901 located on the center right of a current block refers to a first reference sample 1902 determined based on an intra prediction mode shown in FIG. 19. Furthermore, a sample 1903 located on the bottom right of the current block refers to a second reference sample 1904 determined based on an intra prediction mode.

In this case, a prediction error is the same and the above-described problem does not occur because the distance from the reference sample is the same between prediction samples having the same vertical coordinates within the current block depending on the direction of an intra prediction mode. Accordingly, in such a case, a gain transform performance can be obtained by performing transform, quantization, etc. without performing the split of a TU.

That is, a prediction error can be reduced and the precision of prediction can be improved because the distance between a prediction sample and a reference sample is reduced by adaptively performing the split of a TU based on the prediction direction of an intra prediction mode in a non-square block.

Specifically, a method of determining whether to perform the split of a TU is described with reference to the following drawing.

Hereinafter, a block having a width greater than a height among non-square blocks is referred to as a wide block, and a block having a height greater than a width among non-square blocks is referred to as a narrow block for convenience of description.

FIG. 20 is a diagram illustrating a split method of a transform unit according to an embodiment of the present invention.

FIG. 20(a) shows a case where in the case of a wide block, the angle of a prediction direction of an intra prediction mode is between 180° and 225°. In this case, the distance between a prediction sample and a reference sample can be reduced by performing the split of a TU.

That is, the encoder/decoder performs the split of a TU when the angle of a prediction direction of an intra prediction mode is between 180° and 225°. In this case, the TU may be split into square blocks. That is, the encoder/decoder splits the TU into square blocks, each one having the height of a current block as the length of one side.

FIG. 20(b) shows a case where in the case of a narrow block, the angle of a prediction direction of an intra prediction mode is between 45° and 90°. In this case, the distance between a prediction sample and a reference sample can be reduced by performing the split of a TU.

That is, the encoder/decoder performs the split of a TU when the angle of a prediction direction of an intra prediction mode is between 45° and 90°. In this case, the TU may be split into square blocks. That is, the encoder/decoder splits the TU into square blocks, each one having the width of a current block as the length of one side.

FIG. 21 is a diagram illustrating a split method of a transform unit according to an embodiment of the present invention.

FIG. 21(a) shows a case where in the case of a wide block, the angle of a prediction direction of an intra prediction mode is between 45° and 180°.

The encoder/decoder may not perform the split of a TU when the angle of a prediction direction of an intra prediction mode is between 45° and 180°.

FIG. 20(b) shows a case where in the case of a narrow block, the angle of a prediction direction of an intra prediction mode is between 90° and 225°.

The encoder/decoder may not perform the split of a TU when the angle of a prediction direction of an intra prediction mode is between 90° and 225°.

That is, if a prediction error according to the distance from a reference sample corresponds to a constant intra prediction mode, the encoder/decoder may not perform the split of a TU.

FIG. 22 is a flowchart illustrating a split method of a transform unit according to an embodiment of the present invention.

The encoder/decoder determines whether a current block on which intra prediction is performed is a non-square block (S2201).

If, as a result of the determination at step S2201, the current block is a non-square block, the encoder/decoder determines whether the width of the current block is greater than the height thereof (S2202).

If, as a result of the determination at step S2202, the width of the current block is greater than the height, the encoder/decoder determines whether the angle of an intra prediction mode is greater than 180° (S2203).

If, as a result of the determination at step S2203, the angle of the prediction mode of the intra prediction mode is greater than 180°, the encoder/decoder reconstructs an intra prediction block in the split TU unit (S2205, S2206).

That is, when the angle of the prediction mode of the intra prediction mode is greater than 180°, the encoder/decoder performs the split of a TU on the current block, and reconstructs an intra predicted block in the split TU unit.

If, as a result of the determination at step S2202, the width of the current block is smaller than the height thereof, the encoder/decoder determines whether the angle of the intra prediction mode is smaller than 90° (S2204).

If, as a result of the determination at step S2204, the angle of the prediction mode of the intra prediction mode is smaller than 90°, the encoder/decoder reconstructs an intra prediction block in a split TU unit (S2205, S2206).

If, as a result of the determination at step S2201, the current block is not a non-square block, if, as a result of the determination at step S2203, the angle of the prediction mode of the intra prediction mode is not greater than 180° or if, as a result of the determination at step S2204, the angle of the prediction mode of the intra prediction mode is not smaller than 90°, the encoder/decoder reconstructs a current block (S2207).

That is, in this case, the encoder/decoder reconstructs the current block without performing the split of a TU.

Embodiment 4

The present embodiment proposes a method of splitting a transform unit without adding a separate syntax by taking into consideration a non-square block.

Specifically, there is proposed a method of performing a TU split by taking into consideration the width and height ratio of a non-square block. The split of a TU may be performed in a batch based on the width and height of a current block without taking into consideration an intra prediction direction.

A method proposed in the present embodiment has an advantage in that computational complexity is small compared to the adaptive split method of a TU proposed in Embodiment 3.

FIG. 23 is a diagram illustrating a split method of a transform unit according to an embodiment of the present invention.

FIG. 23(a) shows a case where when the width (or horizontality) of a current block is W and the height (or verticality) thereof is H, the ratio of the width and the height is 1:2. In this case, the encoder/decoder may split the current block into two TUs, each one having a W×W size.

FIG. 23(b) shows a case where when the width (or horizontality) of a current block is W and the height (or verticality) is H, the ratio of the width and the height is 1:2. In this case, the encoder/decoder may split the current block into four TUs, each one having a W×W size.

That is, in the existing QTBT block structure, a PU and a TU are not classified. In contrast, according to the method proposed in the present embodiment, the split of a TU may be performed in a batch in a non-square block.

The distance between a prediction sample and a reference sample can be reduced based on the prediction direction of an intra prediction mode by performing a TU split on a non-square current block as described in FIG. 18. Accordingly, a prediction error can be reduced, and the precision of prediction can be improved.

Furthermore, as in Embodiment 3, the encoder/decoder performs encoding/decoding based on a split TU. In other words, prediction may be performed and reconfiguration (i.e., reconstruction) may be performed using an actual reference sample in a split TU unit.

FIG. 24 is a diagram illustrating an intra prediction method according to an embodiment of the present invention.

If a current block is a non-square block, the encoder/decoder configures a reference sample to be used for the prediction of the current block based on width and height information of the current block (S2401).

As described in FIG. 8, when the size of a current block is N×M, the encoder/decoder may configure reference samples to be used for the prediction of the current block using one sample neighboring the top left of the current block, M samples neighboring the left of the current block, N samples neighboring the bottom left of the current block, N samples neighboring the top of the current block, and M samples neighboring the top right of the current block.

Furthermore, as described above, if some of the surrounding samples of the current block has not yet been decoded or is not available, the encoder/decoder may configure reference samples to be used for prediction by substituting unavailable samples with available samples.

Furthermore, after a reference sample is padded, the encoder/decoder may perform the filtering of the reference sample using the method described in FIG. 5.

The encoder/decoder derives the intra prediction mode of the current block (S2402).

The encoder/decoder may derive the intra prediction mode of the current block using the method described in FIG. 5.

Furthermore, the encoder/decoder may adaptively determine a plurality of intra prediction modes that will be applied to the current block based on the width and height information of the current block. In this case, the intra prediction mode of the current block may be derived from among the plurality of determined intra prediction modes. That is, the intra prediction mode of the current block may be determined as one of the plurality of determined intra prediction modes.

As described above, the encoder/decoder may differentially distribute prediction directions of intra prediction mode candidates based on the width and height ratio of a current block.

In other words, a plurality of intra prediction modes applicable to the current block may be determined as intra prediction modes having differentially distributed prediction directions based on the ratio of the width and height of the current block.

Furthermore, as described above, when the width is greater among the width and height of a current block, the encoder/decoder may distribute a larger number of prediction directions between the prediction direction of an angle of 45° and the prediction direction of an angle of 135° than between the prediction direction of the angle of 135° and the prediction direction of an angle of 225°.

Furthermore, when the height is greater among the width and height of a current block, the encoder/decoder may distribute a larger number of prediction directions between the prediction direction of an angle of 135° and the prediction direction of an angle of 225° than between the prediction direction of an angle of 45° and the prediction direction of the angle of 135°.

Furthermore, as described above, the encoder/decoder can reduce bits to represent an intra prediction mode in an encoding/decoding process by removing a specific number of prediction directions from the prediction directions of intra prediction modes based on the width and height ratio of a current block among the prediction directions of the intra prediction modes.

Furthermore, as described above, the encoder/decoder may redistribute intra prediction modes in such a manner that prediction directions are removed by sub-sampling prediction directions of a specific angle range among the prediction directions of intra prediction mode candidates based on the width and height ratio of a current block.

Furthermore, as described above, the encoder/decoder may dispose a removed prediction direction as a direction that cannot be represented by the existing prediction direction.

Specifically, a plurality of prediction directions of the prediction directions of intra prediction mode candidates may be removed based on the width and height ratio of a current block, and prediction directions may be added to a specific angle range, including vertical modes or horizontal modes corresponding to the number of removed prediction direction.

Furthermore, a plurality of prediction directions of the prediction directions of intra prediction mode candidates may be removed based on the width and height ratio of a current block, and prediction directions corresponding to the number of removed prediction directions may be added between a plurality of prediction directions neighboring a vertical mode or horizontal mode.

The encoder/decoder generates a prediction sample of the current block using the reference sample based on the intra prediction mode of the current block (S2403).

Furthermore, if intra prediction is performed in a non-square block, the encoder/decoder may adaptively determine the split of a transform unit by taking into consideration the direction of an intra prediction mode.

For example, the encoder/decoder may determine whether to split a current block into a plurality of square sub-blocks based on the width and height ratio of the current block. Furthermore, in this case, the sub-block may be identical with a transform unit by which the residual signal of the current block is transformed. If the current block is not split into a plurality of square sub-blocks, the encoder/decoder may generate a prediction sample of the current block in the current block unit. If the current block is split into a plurality of square sub-blocks, the encoder/decoder may generate a prediction sample of the current block in the sub-block unit.

Furthermore, for example, when the width is greater in the width and height of the current block and the angle of the intra prediction mode of the current block is greater than 180°, the encoder/decoder may split the current block into a plurality of square sub-blocks. In this case, the sub-block may be identical with a transform unit by which the residual signal of the current block is transformed. Furthermore, the prediction sample of the current block may be generated in the sub-block unit using the reference sample based on the intra prediction mode of the current block.

Furthermore, for example, when the height is greater in the width and height of the current block and the angle of the intra prediction mode of the current block is smaller than 90°, the encoder/decoder may split the current block into a plurality of square sub-blocks. In this case, the sub-block may be identical with a transform unit by which the residual signal of the current block is transformed. Furthermore, the prediction sample of the current block may be generated in the sub-block unit using the reference sample based on the intra prediction mode of the current block.

Furthermore, for example, the encoder/decoder may split the current block into a plurality of square sub-blocks. In this case, the sub-block may be identical with a transform unit by which the residual signal of the current block is transformed. Furthermore, the prediction sample of the current block may be generated in the sub-block unit using the reference sample based on the intra prediction mode of the current block.

FIG. 25 is a diagram illustrating an intra prediction unit according to an embodiment of the present invention.

In FIG. 25, the intra prediction unit has been illustrated as being a single block, for convenience of description, but the intra prediction unit may be implemented as an element included in the encoder and/or the decoder.

Referring to FIG. 25, the intra prediction unit implements the functions, processes and/or methods proposed in FIGS. 5 to 24. Specifically, the intra prediction unit may include a reference sample configuration unit 2501, a prediction mode derivation unit 2502 and a prediction sample generation unit 2503.

The reference sample configuration unit 2501 configures a reference sample to be used for the prediction of a current block based on width and height information of the current block if the current block is a non-square block.

As described in FIG. 8, if the size of a current block is N×M, the reference sample configuration unit 2501 may configure reference samples to be used for prediction of the current block using one sample neighboring the top left of the current block, M samples neighboring the left of the current block, N samples neighboring the bottom left of the current block, N samples neighboring the top of the current block, and M samples neighboring the top right of the current block.

Furthermore, as described above, if some of the surrounding samples of the current block has not yet been decoded or is not available, the reference sample configuration unit 2501 may configure reference samples to be used for prediction by substituting unavailable samples with available samples.

Furthermore, after a reference sample is padded, the reference sample configuration unit 2501 may perform the filtering of the reference sample using the method described in FIG. 5.

The prediction mode derivation unit 2502 derives the intra prediction mode of the current block.

As described above, the prediction mode distribution unit 2502 may differentially distribute the prediction directions of intra prediction mode candidates based on the width and height ratio of a current block.

The prediction mode derivation unit 2502 may derive the intra prediction mode of a current block using the method described in FIG. 5.

Furthermore, the prediction mode derivation unit 2502 may adaptively determine a plurality of intra prediction modes to be applied to a current block based on width and height information of the current block. In this case, the intra prediction mode of the current block may be derived from among the plurality of determined intra prediction modes. That is, the intra prediction mode of the current block may be determined as one intra prediction mode of the plurality of determined intra prediction modes.

Furthermore, as described above, when the width is greater among the width and height of a current block, the prediction mode derivation unit 2502 may distribute a larger number of prediction directions between the prediction direction of an angle of 45° and the prediction direction of an angle of 135° than between the prediction direction of the angle of 135° and the prediction direction of an angle of 225°.

Furthermore, when the height is greater among the width and height of a current block, the prediction mode derivation unit 2502 may distribute a larger number of prediction directions between the prediction direction of an angle of 135° and the prediction direction of an angle of 225° than between the prediction direction of an angle of 45° and the prediction direction of the angle of 135°.

Furthermore, as described above, the prediction mode derivation unit 2502 can reduce bits to represent an intra prediction mode in an encoding/decoding process by removing a specific number of prediction directions from the prediction directions of intra prediction modes based on the width and height ratio of a current block among the prediction directions of the intra prediction modes.

Furthermore, as described above, the prediction mode derivation unit 2502 may redistribute intra prediction modes in such a manner that prediction directions are removed by sub-sampling prediction directions of a specific angle range among the prediction directions of intra prediction mode candidates based on the width and height ratio of a current block.

Furthermore, as described above, the prediction mode derivation unit 2502 may position a removed prediction direction as a direction that cannot be represented by the existing prediction direction.

Specifically, the prediction mode derivation unit 2502 may remove a plurality of prediction directions among the prediction directions of intra prediction mode candidates based on the width and height ratio of a current block, and may add prediction directions, corresponding to the number of removed prediction directions, to a specific angle range including a vertical mode or a horizontal mode.

Furthermore, the prediction mode derivation unit 2502 may remove a plurality of prediction directions among the prediction directions of intra prediction mode candidates based on the width and height ratio of a current block, and may add prediction directions, corresponding to the number of removed prediction directions, between a plurality of prediction directions neighboring a vertical mode or a horizontal mode.

The prediction sample generation unit 2503 generates a prediction sample of a current block using the reference sample based on the intra prediction mode of the current block.

Furthermore, as described above, if intra prediction is performed in a non-square block, the encoder/decoder may adaptively determine the split of a transform unit by taking into consideration the direction of an intra prediction mode.

In the aforementioned embodiments, the elements and characteristics of the present invention have been combined in specific forms. Each of the elements or characteristics may be considered to be optional unless explicitly described otherwise. Each of the elements or characteristics may be implemented in a form not combined with another element or characteristic. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

As described above, the preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of processing video based on an intra prediction mode, the method comprising:
    configuring, by a processor, a reference sample to be used for prediction of a current block based on width and height information of the current block;
    deriving, by the processor, an intra prediction mode of the current block from a plurality of intra prediction modes applicable to the current block; and
    generating, by the processor, a prediction sample of the current block using the reference sample based on the intra prediction mode of the current block,
    wherein, based on the current block being a non-square block, one or more first intra prediction modes in the plurality of intra prediction modes applicable to the current block are replaced by one or more second intra prediction modes, the one or more second intra prediction modes covering a specific angle range determined based on a ratio of the width and height information of the current block.

2. The method of claim 1, wherein when the width of the current block is N and the height of the current block is M, the reference sample is configured with one sample neighboring a top left of the current block, M samples neighboring a left of the current block, N samples neighboring a bottom left of the current block, N samples neighboring a top of the current block and M samples neighboring a top right of the current block.

3. The method of claim 1, wherein the plurality of intra prediction modes applicable to the current block is determined as intra prediction modes in which prediction directions are differentially distributed based on the ratio of the width and height information of the current block.

4. The method of claim 1, wherein when the width is greater among the width and height of the current block, the plurality of intra prediction modes applicable to the current block is determined as intra prediction modes in which a number of prediction directions is more distributed between a prediction direction of an angle of 45° and a prediction direction of an angle of 135° than between a prediction direction of an angle of 135° and a prediction of an angle of 225°.

5. The method of claim 1, wherein when the height is greater among the width and height of the current block, the plurality of intra prediction modes applicable to the current block is determined as intra prediction modes in which a number of prediction directions is more distributed between a prediction direction of an angle of 135° and a prediction of an angle of 225° than between a prediction direction of an angle of 45° and a prediction direction of an angle of 135°.

6. The method of claim 1, wherein the plurality of intra prediction modes applicable to the current block is determined by sub-sampling a prediction direction of the specific angle range based on the ratio of the width and height information of the current block.

7. The method of claim 1, wherein a number of the first intra prediction modes is the same as a number of the second intra prediction modes.

8. The method of claim 1, further comprising: determining, by the processor, whether to split the current block into a plurality of square sub-blocks based on the ratio of the width and height information of the current block, wherein if the current block is not split into a plurality of square sub-blocks, the prediction sample of the current block is generated in a current block unit, wherein if the current block is split into a plurality of square sub-blocks, the prediction sample of the current block is generated in a sub-block unit, and wherein the sub-block is identical with a transform unit transforming a residual signal of the current block.

9. The method of claim 1, further comprising: splitting, by the processor, the current block into a plurality of square sub-blocks when the width is greater among the width and height of the current block and an angle of the intra prediction mode of the current block is greater than 180°, wherein the prediction sample of the current block is generated in a sub-block unit using the reference sample based on the intra prediction mode of the current block, and wherein the sub-block is identical with a transform unit transforming a residual signal of the current block.

10. The method of claim 1, further comprising: splitting, by the processor, the current block into a plurality of square sub-blocks when the height is greater among the width and height of the current block and an angle of the intra prediction mode of the current block is smaller than 90°, wherein the prediction sample of the current block is generated in a sub-block unit using the reference sample based on the intra prediction mode of the current block, and wherein the sub-block is identical with a transform unit transforming a residual signal of the current block.

11. The method of claim 1, further comprising: splitting, by the processor, the current block into a plurality of square sub-blocks, wherein the prediction sample of the current block is generated in a sub-block unit using the reference sample based on the intra prediction mode of the current block, and wherein the sub-block is identical with a transform unit transforming a residual signal of the current block.

12. An apparatus processing video based on an intra prediction mode, comprising:
a processor configured to:
configure a reference sample to be used for prediction of a current block based on width and height information of the current block;
derive an intra prediction mode of the current block from a plurality of intra prediction modes applicable to the current block; and
generate a prediction sample of the current block using the reference sample based on the intra prediction mode of the current block; and
a memory configured to exchange data with the processor,
wherein, based on the current block being a non-square block, one or more first intra prediction modes in the plurality of intra prediction modes applicable to the current block are replaced by one or more second intra prediction modes, the one or more second intra prediction modes covering a specific angle range determined based on a ratio of the width and height information of the current block.

13. The apparatus of claim 12, wherein the processor is configured to determine the plurality of intra prediction modes applicable to the current block as intra prediction modes in which prediction directions are differentially distributed based on the ratio of the width and height information of the current block.

14. The apparatus of claim 12, wherein a number of the first intra prediction modes is the same as a number of the second intra prediction modes.

15. The apparatus of claim 12, wherein the specific angle range of the second prediction modes corresponds inversely to an angle range of the first prediction modes.

16. The method of claim 7, wherein the specific angle range of the second prediction modes corresponds inversely to an angle range of the first prediction modes.

17. The apparatus of claim 12,
wherein the processor is configured to determine whether to split the current block into a plurality of square sub-blocks based on the ratio of the width and height information of the current block,
wherein if the current block is not split into a plurality of square sub-blocks, the prediction sample of the current block is generated in a current block unit,
wherein if the current block is split into a plurality of square sub-blocks, the prediction sample of the current block is generated in a sub-block unit, and
wherein the sub-block is identical with a transform unit transforming a residual signal of the current block.

18. The apparatus of claim 12,
wherein the processor is configured to split the current block into a plurality of square sub-blocks when the width is greater among the width and height of the current block and an angle of the intra prediction mode of the current block is greater than 180°,
wherein the prediction sample of the current block is generated in a sub-block unit using the reference sample based on the intra prediction mode of the current block, and
wherein the sub-block is identical with a transform unit transforming a residual signal of the current block.

19. The apparatus of claim 12,
wherein the processor is configured to split the current block into a plurality of square sub-blocks when the height is greater among the width and height of the current block and an angle of the intra prediction mode of the current block is smaller than 90°,
wherein the prediction sample of the current block is generated in a sub-block unit using the reference sample based on the intra prediction mode of the current block, and
wherein the sub-block is identical with a transform unit transforming a residual signal of the current block.

20. The apparatus of claim 12,
wherein the processor is configured to split the current block into a plurality of square sub-blocks,
wherein the prediction sample of the current block is generated in a sub-block unit using the reference sample based on the intra prediction mode of the current block, and
wherein the sub-block is identical with a transform unit transforming a residual signal of the current block.

* * * * *